United States Patent
Tang et al.

(10) Patent No.: US 10,798,628 B2
(45) Date of Patent: Oct. 6, 2020

(54) CELL HANDOVER METHOD, APPARATUS, AND DEVICE

(71) Applicant: HUAWEI TECHNOLOGIES CO., LTD., Shenzhen, Guangdong (CN)

(72) Inventors: Xun Tang, Beijing (CN); Wei Quan, Beijing (CN); Jian Zhang, Beijing (CN); Jinhua Miao, Shenzhen (CN); Yongqiang Gao, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/928,999

(22) Filed: Mar. 22, 2018

(65) Prior Publication Data

US 2018/0213457 A1    Jul. 26, 2018

Related U.S. Application Data

(63) Continuation of application No. PCT/CN2015/090824, filed on Sep. 25, 2015.

(51) Int. Cl.
*H04W 36/08* (2009.01)
*H04W 36/00* (2009.01)

(52) U.S. Cl.
CPC ....... *H04W 36/08* (2013.01); *H04W 36/0072* (2013.01); *H04W 36/0083* (2013.01)

(58) Field of Classification Search
None
See application file for complete search history.

(56) References Cited

U.S. PATENT DOCUMENTS

2008/0267127 A1* 10/2008 Narasimha ........ H04W 36/0077
                                                   370/331
2008/0268850 A1* 10/2008 Narasimha ........ H04W 36/0072
                                                   455/437

(Continued)

FOREIGN PATENT DOCUMENTS

| CN | 101860931 A | 10/2010 |
| CN | 101932052 A | 12/2010 |

(Continued)

OTHER PUBLICATIONS

Ayman Elnashar et al.,"Looking at LTE in Practice:A Performance Analysis of the LTE System Based on Field Test Results",IEEE vehicular technology magazine,Sep. 2013,total 12 pages.

(Continued)

*Primary Examiner* — Kodzovi Acolatse
(74) *Attorney, Agent, or Firm* — Womble Bond Dickinson (US) LLP

(57) ABSTRACT

A cell handover method and apparatus, and a device. The cell handover method includes: receiving, by user equipment (UE), a handover command sent by a source cell, where the handover command comprises indication information of an uplink scheduling resource indication UL grant indication information of a UL grant of a target cell; determining, by the UE based on the UL grant the indication information of the UL grant, the UL grant of the target cell; and sending, by the UE based on the UL grant, uplink data to the target cell, where the uplink data includes at least one of the following: a handover complete message, a buffer status report, or service data. Embodiments provide a cell handover method and apparatus, and a device, so as to reduce a delay time in a cell handover procedure.

9 Claims, 12 Drawing Sheets

(56) References Cited

U.S. PATENT DOCUMENTS

| | | | |
|---|---|---|---|
| 2010/0290427 A1* | 11/2010 | Sebire | H04W 36/0055 370/331 |
| 2011/0243066 A1* | 10/2011 | Nayeb Nazar | H04L 1/007 370/328 |
| 2012/0093128 A1* | 4/2012 | Song | H04W 36/0077 370/331 |
| 2013/0051254 A1* | 2/2013 | Wilhelmsson | H04W 72/1215 370/252 |
| 2013/0223409 A1 | 8/2013 | Jung et al. | |
| 2014/0080490 A1* | 3/2014 | Bergstrom | H04W 56/0005 455/437 |
| 2014/0106757 A1 | 4/2014 | Hakola et al. | |
| 2014/0198768 A1 | 7/2014 | Hahn et al. | |
| 2015/0043472 A1* | 2/2015 | Seo | H04W 36/08 370/329 |
| 2015/0105084 A1 | 4/2015 | Bontu et al. | |
| 2015/0223124 A1* | 8/2015 | Wang | H04W 24/08 455/436 |
| 2015/0319774 A1* | 11/2015 | Cai | H04W 72/14 370/329 |
| 2016/0219484 A1 | 7/2016 | Bontu et al. | |
| 2017/0041841 A1* | 2/2017 | Pedersen | H04W 56/0045 |
| 2018/0152924 A1* | 5/2018 | Ouchi | H04W 48/10 |
| 2018/0220458 A1* | 8/2018 | Ouchi | H04J 11/00 |

FOREIGN PATENT DOCUMENTS

| | | |
|---|---|---|
| CN | 101998553 A | 3/2011 |
| CN | 103202067 A | 7/2013 |
| CN | 104782178 A | 7/2015 |
| EP | 2116085 B1 | 3/2012 |

OTHER PUBLICATIONS

3GPP TSG RAN WG2 Meeting #66bis R2-093929,"RACH-less handover in CoMP",Huawei,Jun. 29-Jul. 3, 2009, total 2 pages.

3GPP TSG-RAN WG2 Meeting #90 R2-152443,"Latency Reduction during Handover",Nokia Networks,May 25-29, 2015,total 3 pages.

3GPP TSG-RAN WG2 Meeting #91 R2-153185,"Latency Reduction during Handover",Nokia Networks,Aug. 24-28, 2015,total 5 pages.

3GPP TS 36.213 V12.7.0 (Sep. 2015);3rd Generation Partnership Project;Technical Specification Group Radio Access Network;Evolved Universal Terrestrial Radio Access (E-UTRA);Physical layer procedures(Release 12),total 241 pages.

3GPP TS 36.300 V13.1.0 (May 2015);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),total 254 pages.

3GPP TS 36.321 V12.7.0 (Sep. 2015);3rd Generation Partnership Project;Technical Specification Group Radio Access Network;Evolved Universal Terrestrial Radio Access (E-UTRA);Medium Access Control (MAC) protocol specification (Release 12),total 77 pages.

3GPP TS 36.331 V12.7.0 (Sep. 2015);3rd Generation Partnership Project;Technical Specification Group Radio Access Network;Evolved Universal Terrestrial Radio Access (E-UTRA);Radio Resource Control (RRC);Protocol specification (Release 12),total 453 pages.

3GPP TR 36.814 V9.0.0 (Mar. 2010);3rd Generation Partnership Project;Technical Specification Group Radio Access Network;Evolved Universal Terrestrial Radio Access (E-UTRA); Further advancements for E-UTRA physical layer aspects(Release 9),total 104 pages.

3GPP TR 36.913 V12.0.0 (Sep. 2014);3rd Generation Partnership Project;Technical Specification Group Radio Access Network;Requirements for further advancements for Evolved Universal Terrestrial Radio Access (E-UTRA) (LTE-Advanced)(Release 12),total 15 pages.

3GPP TSG RAN WG1 Meeting #56bis R1-091618,"System performance evaluation for uplink CoMP",Huawei ,Mar. 23-27, 2009,total 9 pages.

3GPP TSG-RAN WG2 Meeting #58bis R2-072385(R2-071864),"Synchronised Handover",Nokia, Nokia Siemens Networks,Jun. 25-29, 2007,total 3 pages.

3GPP TSG RAN WG2 Meeting #58bis R2-073265,"Synchronized handover",Panasonic,Aug. 20-24,total 4 pages.

XP050603109 R2-072655 Alcatel-Lucent,"RACH-less Handover in synchronized networks",3GPP TSG-RAN WG 2 #58bis LTE Orlando; Jun. 25-Jun. 29, 2007,total 3 pages.

XP050134214 R2-071253 Nokia,"Non contention based HO",3GPP TSG-RAN WG2 Meeting #57bis St. Julian"s, Malta,Mar. 26-30, 2007,total 7 pages.

* cited by examiner

CELL HANDOVER METHOD, APPARATUS, AND DEVICE

CROSS-REFERENCE TO RELATED APPLICATIONS

This application is a continuation of International Application No. PCT/CN2015/090824, filed on Sep. 25, 2015, the disclosure of which is hereby incorporated by reference in its entirety.

TECHNICAL FIELD

The specification relates to cell handover technologies, and in particular, to a cell handover method and apparatus, and a device.

BACKGROUND

Compared with a wired communications system, a wireless communications system has an advantage that UE (user equipment) may move freely. In a cellular communications system, UE movement can cause a change of a serving cell. This procedure is referred to as a cell handover procedure.

FIG. 1 is a flowchart of a cell handover procedure. In FIG. 1, an application scenario in which a source cell and a target cell in an LTE (Long Term Evolution) system respectively correspond to different base stations is used as an example for description. Handover operations include:

A. UE completes neighboring cell measurement according to a configuration of a source eNB and feeds back a measurement report to the source eNB. The source eNB determines whether handover should be performed according to a signal strength of a neighboring cell and a signal strength of a local cell. If handover should be performed, operation B is performed.

B. The source eNB sends a handover request to a target eNB. If the target eNB has sufficient resources to be allocated to the to-be-handed-over UE, operation C is performed.

C. The target eNB feeds back a handover acknowledgement message (handover request confirm) to the source eNB. The foregoing procedure is referred to as a handover preparation phase.

D. The source eNB then sends a handover command to the UE. After receiving the handover command, the UE disconnects from the source eNB and stops data transmission. The UE starts to monitor downlink synchronization information of the target cell. After downlink synchronization is complete, a random access procedure starts. First, the UE sends a random access preamble signal. After detecting a preamble sequence, the target eNB sends an uplink transmission resource indication to the UE, for example, a UL grant (uplink scheduling resource indication) or the like. The UE receives the UL grant and feeds back a handover complete message (handover complete) to the target eNB.

F. After the target eNB returns an acknowledgement ACK, the handover procedure is complete and data transmission is restored.

G. The target eNB further sends an uplink path update message (Uplink plane update) to an MME (mobility management entity)/UPE (user plane entity).

In the cell handover procedure, data transmission is interrupted for a relatively long time, approximately 50 ms on average. For application scenarios with a high requirement for transmission delay, for example, online video and real-time gaming, cell handover breaks continuity of data transmission and affects user experience.

SUMMARY

Embodiments provide a cell handover method and apparatus, and a device, so as to reduce a delay time in a cell handover procedure.

According to a first aspect, an embodiment provides a cell handover method, and the method includes:

receiving, by a user terminal, a handover command sent by a source cell, where the handover command includes indication information of an uplink scheduling resource indication of a target cell;

determining, by the user terminal according to the indication information of the uplink scheduling resource indication, the uplink scheduling resource indication of the target cell; and sending, by the user terminal according to the uplink scheduling resource indication, uplink data to the target cell, where the uplink data includes at least one of the following: a handover complete message, a buffer status report, or service data.

Optionally, the handover command further includes timing advance TA indication information.

The method further includes: determining, by the user terminal according to the TA indication information, a TA used by the user terminal in the target cell;

the sending, by the user terminal according to the uplink scheduling resource indication, uplink data to the target cell includes:

sending, by the user terminal according to the TA used by the user terminal in the target cell and the uplink scheduling resource indication, the uplink data to the target cell.

Optionally, the TA indication information is the TA used by the user terminal in the target cell; or the TA indication information is first indication information indicating that a TA of the target cell is the same as a TA of the source cell; and the determining, by the user terminal according to the TA indication information, a TA used by the user terminal in the target cell includes:

using, by the user terminal according to the first indication information, a TA used by the user terminal in the source cell as the TA used in the target cell; where the TA indication information includes the TA of the source cell, second indication information instructing to calculate the TA of the target cell based on the TA of the source cell, and downlink signal sending moment information of the source cell and the target cell; or the determining, by the user terminal according to the TA indication information, a TA used by the user terminal in the target cell includes:

separately detecting, by the user terminal according to the second indication information, a downlink signal arrival time of the source cell and a downlink signal arrival time of the target cell;

determining, by the user terminal according to the downlink signal arrival time of the source cell, the downlink signal arrival time of the target cell, and the downlink signal sending moment information of the source cell and the target cell, a downlink synchronization delay difference between the source cell and the target cell; and determining, by the user terminal according to the downlink synchronization delay difference and the TA of the source cell, the TA used by the user terminal in the target cell.

Optionally, the downlink signal sending moment information is at least one of the following:

third indication information indicating a downlink signal of the source cell and a downlink signal of the target cell are synchronization signals;

a downlink signal sending moment of the source cell and a downlink signal sending moment of the target cell; or a downlink signal sending moment difference between the target cell and the source cell.

Optionally, the handover command further includes uplink transmit power indication information.

The method further includes: determining, by the user terminal according to the uplink transmit power indication information, an uplink transmit power of the user terminal in the target cell; and the sending, by the user terminal according to the uplink scheduling resource indication, uplink data to the target cell includes:

sending, by the user terminal according to the uplink scheduling resource indication, the uplink data to the target cell by using the uplink transmit power.

Optionally, the uplink transmit power indication information is the uplink transmit power used by the user terminal in the target cell; or the uplink transmit power indication information is offset information of offset based on an uplink transmit power of the source cell; or the uplink transmit power indication information is fourth indication information instructing the user terminal to determine the uplink transmit power of the user terminal in the target cell according to a downlink signal transmit power and a downlink signal receive power of the target cell; and the determining, by the user terminal according to the uplink transmit power indication information, an uplink transmit power of the user terminal in the target cell includes:

receiving, by the user terminal according to the fourth indication information, a cell broadcast message from the target cell, where the cell broadcast message includes the downlink signal transmit power of the target cell;

determining, by the user terminal according to the received cell broadcast message, the downlink signal receive power;

determining, by the user terminal according to the downlink signal transmit power and the downlink signal receive power, a downlink path loss value of the target cell; and determining, by the user terminal according to the downlink path loss value and a preset receive power expected by the target cell, the uplink transmit power of the user terminal in the target cell.

Optionally, the indication information of the uplink scheduling resource indication includes the uplink scheduling resource indication and information about an uplink scheduling resource indication effective time that are of the target cell.

Optionally, the information about the uplink scheduling resource indication effective time includes at least one of the following information:

fifth indication information instructing the uplink scheduling resource indication to take effect at a preset time after the user terminal receives the handover command;

valid duration or a valid quantity of times indicated by the uplink scheduling resource indication; or an effective moment indicated by the uplink scheduling resource indication.

Optionally, the indication information of the uplink scheduling resource indication includes physical downlink control channel PDCCH monitoring indication information used to instruct the user terminal to monitor a PDCCH of the target cell; and the determining, by the user terminal according to the indication information of the uplink scheduling resource indication, the uplink scheduling resource indication of the target cell includes:

monitoring, by the user terminal according to the PDCCH monitoring indication information, the PDCCH; and determining, by the user terminal according to downlink control information DCI transmitted on the detected PDCCH, the uplink scheduling resource indication of the target cell.

Optionally, the PDCCH monitoring indication information includes PDCCH monitoring valid-time information; and the monitoring, by the user terminal according to the PDCCH monitoring indication information, the PDCCH includes:

monitoring, by the user terminal according to the PDCCH monitoring valid-time information, the PDCCH.

Optionally, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

Optionally, after the determining, by the user terminal according to downlink control information DCI transmitted on the detected PDCCH, the uplink scheduling resource indication of the target cell, before the sending uplink data to the target cell, the method further includes:

sending, by the user terminal, an acknowledgement ACK message to the target cell on a physical uplink control channel PUCCH corresponding to the PDCCH, so that the target cell determines, according to the ACK message, that the user terminal has detected the PDCCH; or sending, by the user terminal on a communication resource indicated by the uplink scheduling resource indication, a demodulation reference signal DMRS to the target cell, where the uplink scheduling resource indication includes a first cyclic shift value used to instruct the user terminal to send the DMRS, and a cyclic shift value used by the user terminal to send the DMRS is a second cyclic shift value different from the first cyclic shift value, and the second cyclic shift value is used by the target cell to determine, according to the DMRS sent by the user terminal, that the user terminal has detected the PDCCH.

According to a second aspect, an embodiment provides a cell handover method, including:

obtaining, by a source cell, indication information of an uplink scheduling resource indication of a target cell;

sending, by the source cell, a handover command to a user terminal, where the handover command includes the indication information of the uplink scheduling resource indication, and the indication information of the uplink scheduling resource indication is used by the user terminal to determine the uplink scheduling resource indication of the target cell, so that the user terminal sends, according to the uplink scheduling resource indication, uplink data to the target cell, where the uplink data includes at least one of the following: a handover complete message, a buffer status report, or service data.

Optionally, the obtaining, by a source cell, indication information of an uplink scheduling resource indication of a target cell includes:

sending, by the source cell, a handover request message to the target cell; and receiving, by the source cell, a handover acknowledgement message sent by the target cell, where the handover acknowledgement message includes the indication information of the uplink scheduling resource indication.

Optionally, the handover request message includes uplink scheduling resource indication request information.

Optionally, the handover acknowledgement message further includes a TA of the target cell; and the handover command further includes TA indication information, where the TA indication information is the TA of the target cell.

Optionally, the handover request message further includes target cell TA request information.

Optionally, the handover acknowledgement message further includes a downlink signal sending moment of the target cell.

The method further includes: determining, by the source cell according to the downlink signal sending moment of the target cell and a downlink signal sending moment of the source cell, downlink signal sending moment information of the source cell and the target cell;

determining, by the source cell, that the user terminal has a TA calculation capability, and generating second indication information used to instruct the user terminal to calculate a TA of the target cell according to a TA of the source cell; and generating, by the source cell, TA indication information, where the TA indication information includes the TA of the source cell, the second indication information, and the downlink signal sending moment information;

the handover command further includes the TA indication information, so that the user terminal separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

Optionally, the downlink signal sending moment information includes the downlink signal sending moment of the source cell and the downlink signal sending moment of the target cell, or the downlink signal sending moment information is a downlink signal sending moment difference between the target cell and the source cell.

Optionally, the handover request message further includes downlink signal sending moment request information of the target cell.

Optionally, the method further includes: obtaining, by the source cell, timing advance TA indication information of the target cell; and the handover command further includes the TA indication information, so that the user terminal determines, according to the TA indication information, a TA used by the user terminal in the target cell.

Optionally, the obtaining, by the source cell, timing advance TA indication information of the target cell includes:

determining, by the source cell, that a downlink signal of the source cell and a downlink signal of the target cell are synchronization signals, and generating third indication information indicating that the downlink signal of the source cell and the downlink signal of the target cell are synchronization signals, where the third indication information is downlink signal sending moment information of the source cell and the target cell;

determining, by the source cell, that the user terminal has a TA calculation capability, and generating second indication information used to instruct the user terminal to calculate a TA of the target cell according to a TA of the source cell; and generating, by the source cell, TA indication information, where the TA indication information includes the TA of the source cell, the second indication information, and the downlink signal sending moment information, so that the user terminal separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

Optionally, the obtaining, by the source cell, timing advance TA indication information of the target cell includes:

determining, by the source cell, whether the source cell and the target cell are in a coordinated multipoint transmission COMP communication scenario; and if the source cell and the target cell are in a COMP communication scenario, determining, by the source cell, that the TA indication information is first indication information indicating that the TA of the target cell is the same as the TA of the source cell, so that the user terminal uses, according to the first indication information, the TA of the source cell as the TA of the target cell.

Optionally, the method further includes:

obtaining, by the source cell, uplink transmit power indication information of the user terminal in the target cell, so that the user terminal determines, according to the uplink transmit power indication information, an uplink transmit power of the user terminal in the target cell; and the handover command includes the uplink transmit power indication information.

Optionally, the uplink transmit power indication information is the uplink transmit power that is preset by the source cell and is used by the user terminal in the target cell; or the uplink transmit power indication information is offset information, preset by the source cell, of offset based on an uplink transmit power of the source cell; or the uplink transmit power indication information is fourth indication information instructing, by the source cell, the user terminal to determine the uplink transmit power of the user terminal in the target cell according to a downlink signal transmit power and a downlink signal receive power of the target cell, so that the user terminal receives, according to the fourth indication information, a cell broadcast message from the target cell, where the cell broadcast message includes the downlink signal transmit power of the target cell; the user terminal determines, according to the received cell broadcast message, the downlink signal receive power; the user terminal determines, according to the downlink signal transmit power and the downlink signal receive power, a downlink path loss value of the target cell; and the user terminal determines, according to the downlink path loss value and a preset receive power expected by the target cell, the uplink transmit power of the user terminal in the target cell.

Optionally, the indication information of the uplink scheduling resource indication includes the uplink scheduling resource indication and information about an uplink scheduling resource indication effective time that are of the target cell.

Optionally, the information about the uplink scheduling resource indication effective time includes at least one of the following information:

fifth indication information instructing the uplink scheduling resource indication to take effect at a preset time after the user terminal receives the handover command;

valid duration or a valid quantity of times indicated by the uplink scheduling resource indication; or an effective moment indicated by the uplink scheduling resource indication.

Optionally, the indication information of the uplink scheduling resource indication includes physical downlink control channel PDCCH monitoring indication information used to instruct the user terminal to monitor a PDCCH of the target cell, so that the user terminal monitors the PDCCH according to the PDCCH monitoring indication information, and determines, according to downlink control information DCI transmitted on the detected PDCCH, the uplink scheduling resource indication of the target cell.

Optionally, the PDCCH monitoring indication information includes PDCCH monitoring valid-time information, so that the user terminal monitors the PDCCH according to the PDCCH monitoring valid-time information.

Optionally, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

According to a third aspect, an embodiment provides a cell handover method, including:

receiving, by a target cell, a handover request message sent by a source cell; and sending, by the target cell, a handover acknowledgement message to the source cell, where the handover acknowledgement message includes indication information of uplink scheduling resource indication, and is used by the source cell to send a handover command to a user terminal according to the handover acknowledgement message, where the handover command includes the indication information of the uplink scheduling resource indication, and the indication information of the uplink scheduling resource indication is used by the user terminal to determine the uplink scheduling resource indication of the target cell, so that the user terminal sends, according to the uplink scheduling resource indication, uplink data to the target cell, where the uplink data includes at least one of the following: a handover complete message, a buffer status report, or service data.

Optionally, the handover request message includes uplink scheduling resource indication request information.

Optionally, the handover acknowledgement message further includes a TA of the target cell; and the source cell uses the TA of the target cell as TA indication information.

Optionally, the handover request message further includes target cell TA request information.

Optionally, the handover acknowledgement message further includes a downlink signal sending moment of the target cell; and the source cell determines, according to the downlink signal sending moment of the target cell and a downlink signal sending moment of the source cell, downlink signal sending moment information of the source cell and the target cell.

Optionally, the handover request message further includes downlink signal sending moment request information of the target cell.

Optionally, the indication information of the uplink scheduling resource indication includes the uplink scheduling resource indication and information about an uplink scheduling resource indication effective time that are of the target cell.

Optionally, the information about the uplink scheduling resource indication effective time includes at least one of the following information:

fifth indication information instructing the uplink scheduling resource indication to take effect at a preset time after the user terminal receives the handover command;

valid duration or a valid quantity of times indicated by the uplink scheduling resource indication; or an effective moment indicated by the uplink scheduling resource indication.

Optionally, the indication information of the uplink scheduling resource indication includes physical downlink control channel PDCCH monitoring indication information used to instruct the user terminal to monitor a PDCCH of the target cell, so that the user terminal monitors the PDCCH according to the PDCCH monitoring indication information, and determines, according to downlink control information DCI transmitted on the detected PDCCH, the uplink scheduling resource indication of the target cell.

Optionally, the PDCCH monitoring indication information includes PDCCH monitoring valid-time information, so that the user terminal monitors the PDCCH according to the PDCCH monitoring valid-time information.

Optionally, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

Optionally, the method further includes:

receiving, by the target cell, the uplink data on a communication resource corresponding to the uplink scheduling resource indication, where the uplink data includes at least one of the following: a handover complete message, a buffer status report, or service data; or detecting, by the target cell, an acknowledgement ACK message on a communication resource corresponding to the uplink scheduling resource indication, and determining, according to the ACK message, that the user terminal has detected the PDCCH; or detecting, by the target cell, a demodulation reference signal DMRS on a communication resource corresponding to the uplink scheduling resource indication; and determining, by the target cell, whether a cyclic shift value of the detected DMRS is the same as a first cyclic shift value carried in the uplink scheduling resource indication; and if they are different, determining that the user terminal has detected the PDCCH.

According to a fourth aspect, an embodiment provides a cell handover apparatus. The apparatus is used as a user terminal and includes:

a receiving module, configured to receive a handover command sent by a source cell, where the handover command includes indication information of an uplink scheduling resource indication of a target cell;

an uplink scheduling resource indication determining module, configured to determine, according to the indication information of the uplink scheduling resource indication, the uplink scheduling resource indication of the target cell; and a sending module, configured to send, according to the uplink scheduling resource indication, uplink data to the target cell, where the uplink data includes at least one of the following: a handover complete message, a buffer status report, or service data.

Optionally, the apparatus further includes: a TA determining module; where the handover command further includes timing advance TA indication information;

the TA determining module is configured to determine, according to the TA indication information, a TA used by the user terminal in the target cell; and the sending module is specifically configured to send, according to the TA used in the target cell and the uplink scheduling resource indication, the uplink data to the target cell.

Optionally, the TA indication information is the TA used by the user terminal in the target cell; or the TA indication information is first indication information indicating that a TA of the target cell is the same as a TA of the source cell; and the TA determining module is specifically configured to use, according to the first indication information, a TA used by the user terminal in the source cell as the TA used in the target cell; where the TA indication information includes the TA of the source cell, second indication information instructing to calculate the TA of the target cell based on the TA of the source cell, and downlink signal sending moment information of the source cell and the target cell; or the TA determining module is specifically configured to separately detect, according to the second indication information, a downlink signal arrival time of the source cell and a downlink signal arrival time of the target cell;

determine, according to the downlink signal arrival time of the source cell, the downlink signal arrival time of the target cell, and the downlink signal sending moment information of the source cell and the target cell, a downlink synchronization delay difference between the source cell and the target cell; and determine, according to the downlink synchronization delay difference and the TA of the source cell, the TA used by the user terminal in the target cell.

Optionally, the downlink signal sending moment information is at least one of the following:

third indication information indicating a downlink signal of the source cell and a downlink signal of the target cell are synchronization signals;

a downlink signal sending moment of the source cell and a downlink signal sending moment of the target cell; or a downlink signal sending moment difference between the target cell and the source cell.

Optionally, the apparatus further includes: an uplink transmit power determining module; where the handover command further includes uplink transmit power indication information;

the uplink transmit power determining module is configured to determine, according to the uplink transmit power indication information, an uplink transmit power of the user terminal in the target cell; and the sending module is specifically configured to send, according to the uplink scheduling resource indication, the uplink data to the target cell by using the uplink transmit power.

Optionally, the uplink transmit power indication information is the uplink transmit power used by the user terminal in the target cell; or the uplink transmit power indication information is offset information of offset based on an uplink transmit power of the source cell; or the uplink transmit power indication information is fourth indication information instructing the user terminal to determine the uplink transmit power of the user terminal in the target cell according to a downlink signal transmit power and a downlink signal receive power of the target cell; and the uplink transmit power determining module is specifically configured to receive, according to the fourth indication information, a cell broadcast message from the target cell, where the cell broadcast message includes the downlink signal transmit power of the target cell; determine, according to the received cell broadcast message, the downlink signal receive power; determine, according to the downlink signal transmit power and the downlink signal receive power, a downlink path loss value of the target cell; and determine, according to the downlink path loss value and a preset receive power expected by the target cell, the uplink transmit power of the user terminal in the target cell.

Optionally, the indication information of the uplink scheduling resource indication includes the uplink scheduling resource indication and information about an uplink scheduling resource indication effective time that are of the target cell.

Optionally, the information about the uplink scheduling resource indication effective time includes at least one of the following information:

fifth indication information instructing the uplink scheduling resource indication to take effect at a preset time after the user terminal receives the handover command;

valid duration or a valid quantity of times indicated by the uplink scheduling resource indication; or an effective moment indicated by the uplink scheduling resource indication.

Optionally, the indication information of the uplink scheduling resource indication includes physical downlink control channel PDCCH monitoring indication information used to instruct the user terminal to monitor a PDCCH of the target cell; and the uplink scheduling resource indication determining module is specifically configured to monitor the PDCCH according to the PDCCH monitoring indication information; and determine, according to downlink control information DCI transmitted on the detected PDCCH, the uplink scheduling resource indication of the target cell.

Optionally, the PDCCH monitoring indication information includes PDCCH monitoring valid-time information.

The uplink scheduling resource indication determining module is specifically configured to monitor the PDCCH according to the PDCCH monitoring valid-time information.

Optionally, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

Optionally, the apparatus further includes a PDCCH detection determining module, configured to send, after determining, according to the downlink control information DCI transmitted on the detected PDCCH, the uplink scheduling resource indication of the target cell, and before sending the uplink data, an acknowledgement ACK message to the target cell on a physical uplink control channel PUCCH corresponding to the PDCCH, so that the target cell determines, according to the ACK message, that the user terminal has detected the PDCCH; or the PDCCH detection determining module is configured to send, after determining, according to the downlink control information DCI transmitted on the detected PDCCH, the uplink scheduling resource indication of the target cell, and before sending the uplink data, a demodulation reference signal DMRS to the target cell on a communication resource indicated by the uplink scheduling resource indication, where the uplink scheduling resource indication includes a first cyclic shift value used to instruct the user terminal to send the DMRS, a cyclic shift value used by the user terminal to send the DMRS is a second cyclic shift value different from the first cyclic shift value, and the second cyclic shift value is used by the target cell to determine, according to the DMRS sent by the user terminal, that the user terminal has detected the PDCCH.

According to a fifth aspect, an embodiment provides a cell handover apparatus. The apparatus is used as a source cell communications terminal and includes:

an information obtaining module, configured to obtain indication information of an uplink scheduling resource indication of a target cell; and a handover command sending module, configured to send a handover command to a user terminal, where the handover command includes the indication information of the uplink scheduling resource indication, and the indication information of the uplink scheduling resource indication is used by the user terminal to determine the uplink scheduling resource indication of the target cell, so that the user terminal sends, according to the uplink scheduling resource indication, uplink data to the target cell, where the uplink data includes at least one of the following: a handover complete message, a buffer status report, or service data.

Optionally, the information obtaining module is specifically configured to send a handover request message to the target cell; and receive a handover acknowledgement message sent by the target cell, where the handover acknowledgement message includes the indication information of the uplink scheduling resource indication.

Optionally, the handover request message includes uplink scheduling resource indication request information.

Optionally, the handover acknowledgement message further includes a TA of the target cell; and the handover command further includes TA indication information, where the TA indication information is the TA of the target cell.

Optionally, the handover request message further includes target cell TA request information.

Optionally, the handover acknowledgement message further includes a downlink signal sending moment of the target cell.

the information obtaining module is further configured to determine, according to the downlink signal sending moment of the target cell and a downlink signal sending moment of the source cell, downlink signal sending moment information of the source cell and the target cell;

generate second indication information used to instruct the user terminal to calculate a TA of the target cell according to a TA of the source cell; and generate TA indication information, where the TA indication information includes the TA of the source cell, the second indication information, and the downlink signal sending moment information; where the handover command further includes the TA indication information, so that the user terminal separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

Optionally, the downlink signal sending moment information includes the downlink signal sending moment of the source cell and the downlink signal sending moment of the target cell, or the downlink signal sending moment information is a downlink signal sending moment difference between the target cell and the source cell.

Optionally, the handover request message further includes downlink signal sending moment request information of the target cell.

Optionally, the information obtaining module is further configured to obtain timing advance TA indication information of the target cell; and the handover command further includes the TA indication information, so that the user terminal determines, according to the TA indication information, a TA used by the user terminal in the target cell.

Optionally, the information obtaining module is specifically configured to determine that a downlink signal of the source cell and the target cell are synchronization signals, and generate third indication information indicating that a downlink signal of the source cell and the downlink signal of the target cell are synchronization signals, where the third indication information is downlink signal sending moment information of the source cell and the target cell; generate second indication information used to instruct the user terminal to calculate a TA of the target cell according to a TA of the source cell; and generate TA indication information, where the TA indication information includes the TA of the source cell, the second indication information, and the downlink signal sending moment information, so that the user terminal separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

Optionally, the information obtaining module is specifically configured to determine whether the source cell and the target cell are in a coordinated multipoint transmission COMP communication scenario; and if the source cell and the target cell are in a COMP communication scenario, determine that the TA indication information is first indication information indicating that the TA of the target cell is the same as the TA of the source cell, so that the user terminal uses, according to the first indication information, the TA of the source cell as the TA of the target cell.

Optionally, the information obtaining module is further configured to obtain uplink transmit power indication information of the user terminal in the target cell, so that the user terminal determines, according to the uplink transmit power indication information, an uplink transmit power of the user terminal in the target cell; and the handover command includes the uplink transmit power indication information.

Optionally, the uplink transmit power indication information is the uplink transmit power that is preset by the source cell and is used by the user terminal in the target cell; or the uplink transmit power indication information is offset information, preset by the source cell, of offset based on an uplink transmit power of the source cell; or the uplink transmit power indication information is fourth indication information instructing, by the source cell, the user terminal to determine the uplink transmit power of the user terminal in the target cell according to a downlink signal transmit power and a downlink signal receive power of the target cell, so that the user terminal receives, according to the fourth indication information, a cell broadcast message from the target cell, where the cell broadcast message includes the downlink signal transmit power of the target cell; the user terminal determines, according to the received cell broadcast message, the downlink signal receive power; the user terminal determines, according to the downlink signal transmit power and the downlink signal receive power, a downlink path loss value of the target cell; and the user terminal determines, according to the downlink path loss value and a preset receive power expected by the target cell, the uplink transmit power of the user terminal in the target cell.

Optionally, the indication information of the uplink scheduling resource indication includes the uplink scheduling resource indication and information about an uplink scheduling resource indication effective time that are of the target cell.

Optionally, the information about the uplink scheduling resource indication effective time includes at least one of the following information:

fifth indication information instructing the uplink scheduling resource indication to take effect at a preset time after the user terminal receives the handover command;

valid duration or a valid quantity of times indicated by the uplink scheduling resource indication; or an effective moment indicated by the uplink scheduling resource indication.

Optionally, the indication information of the uplink scheduling resource indication includes physical downlink control channel PDCCH monitoring indication information used to instruct the user terminal to monitor a PDCCH of the target cell, so that the user terminal monitors the PDCCH according to the PDCCH monitoring indication information, and determines, according to downlink control information DCI transmitted on the detected PDCCH, the uplink scheduling resource indication of the target cell.

Optionally, the PDCCH monitoring indication information includes PDCCH monitoring valid-time information, so that the user terminal monitors the PDCCH according to the PDCCH monitoring valid-time information.

Optionally, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

According to a sixth aspect, an embodiment provides a cell handover apparatus. The apparatus is used as a target cell communications terminal and includes:

a receiving module, configured to receive a handover request message sent by a source cell; and a handover acknowledgement message sending module, configured to send a handover acknowledgement message to the source cell, where the handover acknowledgement message includes indication information of uplink scheduling resource indication, and is used by the source cell to send a handover command to a user terminal according to the handover acknowledgement message, where the handover command includes the indication information of the uplink scheduling resource indication, and the indication information of the uplink scheduling resource indication is used by the user terminal to determine the uplink scheduling resource indication of the target cell, so that the user terminal sends, according to the uplink scheduling resource indication, uplink data to the target cell, where the uplink data includes at least one of the following: a handover complete message, a buffer status report, or service data.

Optionally, the handover request message includes uplink scheduling resource indication request information.

Optionally, the handover acknowledgement message further includes a TA of the target cell; and the source cell uses the TA of the target cell as TA indication information.

Optionally, the handover request message further includes target cell TA request information.

Optionally, the handover acknowledgement message further includes a downlink signal sending moment of the target cell; and the source cell determines, according to the downlink signal sending moment of the target cell and a downlink signal sending moment of the source cell, downlink signal sending moment information of the source cell and the target cell.

Optionally, the handover request message further includes downlink signal sending moment request information of the target cell.

Optionally, the indication information of the uplink scheduling resource indication includes the uplink scheduling resource indication and information about an uplink scheduling resource indication effective time that are of the target cell.

Optionally, the information about the uplink scheduling resource indication effective time includes at least one of the following information:

fifth indication information instructing the uplink scheduling resource indication to take effect at a preset time after the user terminal receives the handover command;

valid duration or a valid quantity of times indicated by the uplink scheduling resource indication; or an effective moment indicated by the uplink scheduling resource indication.

Optionally, the indication information of the uplink scheduling resource indication includes physical downlink control channel PDCCH monitoring indication information used to instruct the user terminal to monitor a PDCCH of the target cell, so that the user terminal monitors the PDCCH according to the PDCCH monitoring indication information, and determines, according to downlink control information DCI transmitted on the detected PDCCH, the uplink scheduling resource indication of the target cell.

Optionally, the PDCCH monitoring indication information includes PDCCH monitoring valid-time information, so that the user terminal monitors the PDCCH according to the PDCCH monitoring valid-time information.

Optionally, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

Optionally, the receiving module is further configured to receive the uplink data on a communication resource corresponding to the uplink scheduling resource indication; or the receiving module is further configured to detect an acknowledgement ACK message on a communication resource corresponding to the uplink scheduling resource indication, and determine, according to the ACK message, that the user terminal has detected the PDCCH; or the receiving module is further configured to detect a demodulation reference signal DMRS on a communication resource corresponding to the uplink scheduling resource indication; determine whether a cyclic shift value of the detected DMRS is the same as a first cyclic shift value carried in the uplink scheduling resource indication, and if they are different, determine that the user terminal has detected the PDCCH.

According to a seventh aspect, an embodiment includes a user terminal device, including: a communications interface, a memory, a processor, and a communications bus, where the communications interface, the memory, and the processor communicate with each other by using the communications bus;

the memory is configured to store a program, and the processor is configured to execute the program stored in the memory; and when the user terminal device runs, the processor runs the program, and the program is configured to perform the following:

receiving a handover command sent by a source cell, where the handover command includes indication information of an uplink scheduling resource indication of a target cell;

determining, according to the indication information of the uplink scheduling resource indication, the uplink scheduling resource indication of the target cell; and sending, according to the uplink scheduling resource indication, uplink data to the target cell, where the uplink data includes at least one of the following: a handover complete message, a buffer status report, or service data.

According to an eighth aspect, an embodiment includes a terminal device, including: a communications interface, a memory, a processor, and a communications bus, where the communications interface, the memory, and the processor communicate with each other by using the communications bus;

the memory is configured to store a program, and the processor is configured to execute the program stored in the memory; and when the user terminal device runs, the processor runs the program, and the program is configured to perform the following:

obtaining indication information of an uplink scheduling resource indication of a target cell;

sending a handover command to a user terminal, where the handover command includes the indication information of the uplink scheduling resource indication, and the indication information of the uplink scheduling resource indication is used by the user terminal to determine the uplink scheduling resource indication of the target cell, so that the user terminal sends, according to the uplink scheduling resource indication, uplink data to the target cell, where the uplink data includes at least one of the following: a handover complete message, a buffer status report, or service data.

According to a ninth aspect, an embodiment includes a terminal device, including: a communications interface, a memory, a processor, and a communications bus, where the communications interface, the memory, and the processor communicate with each other by using the communications bus;

the memory is configured to store a program, and the processor is configured to execute the program stored in the memory; and when the user terminal device runs, the processor runs the program, and the program is configured to perform the following:

receiving a handover request message sent by a source cell; and sending a handover acknowledgement message to the source cell, where the handover acknowledgement message includes indication information of uplink scheduling resource indication, and is used by the source cell to send a handover command to a user terminal according to the handover acknowledgement message, where the handover command includes the indication information of the uplink scheduling resource indication, and the indication information of the uplink scheduling resource indication is used by the user terminal to determine the uplink scheduling resource indication of the target cell, so that the user terminal sends, according to the uplink scheduling resource indication, uplink data to the target cell, where the uplink data includes at least one of the following: a handover complete message, a buffer status report, or service data.

According to the cell handover method and apparatus, and the device in the embodiments, UE obtains an uplink transmission resource such as a UL grant from the source cell, skips a random access procedure, and shortens a data transmission interruption time, to reduce a data transmission delay time in the cell handover procedure.

DESCRIPTION OF EMBODIMENTS

In the specification, UE being a user terminal is used as an example to describe technical solutions in the specification. Solutions in which other devices are used as a user terminal are not described in detail herein.

An average data transmission interruption time of UE is 50 ms in a cell handover procedure. This breaks continuity of data transmission and affects user experience for online video, real-time gaming, and other application scenarios with a high requirement for delay.

In the cell handover procedure, a main factor of UE-side data transmission interruption is that the UE should obtain an uplink transmission resource, such as a UL grant, allocated by a target cell in a random access procedure. A UE-side delay in the random access procedure includes: waiting for a random access time-frequency resource, sending a random preamble sequence, waiting for a random access response from a target cell, processing a random access response message, and waiting for an uplink transmission resource.

An embodiment provides a cell handover method. In this method, UE obtains an uplink transmission resource, such as a UL grant, from a source cell, skips a random access procedure, and shortens a data transmission interruption time, to reduce the data transmission delay time in the cell handover procedure.

Specific embodiments are used below to describe in detail the technical solutions. The following several specific embodiments may be combined with each other, and a same or similar concept or procedure may not be described repeatedly in some embodiments.

The cell handover method in this embodiment may be applied to a scenario in which a source cell and a target cell belong to a same eNB, or a handover scenario in which a base station of the source cell and a base station of the target cell are different.

Figure 1:
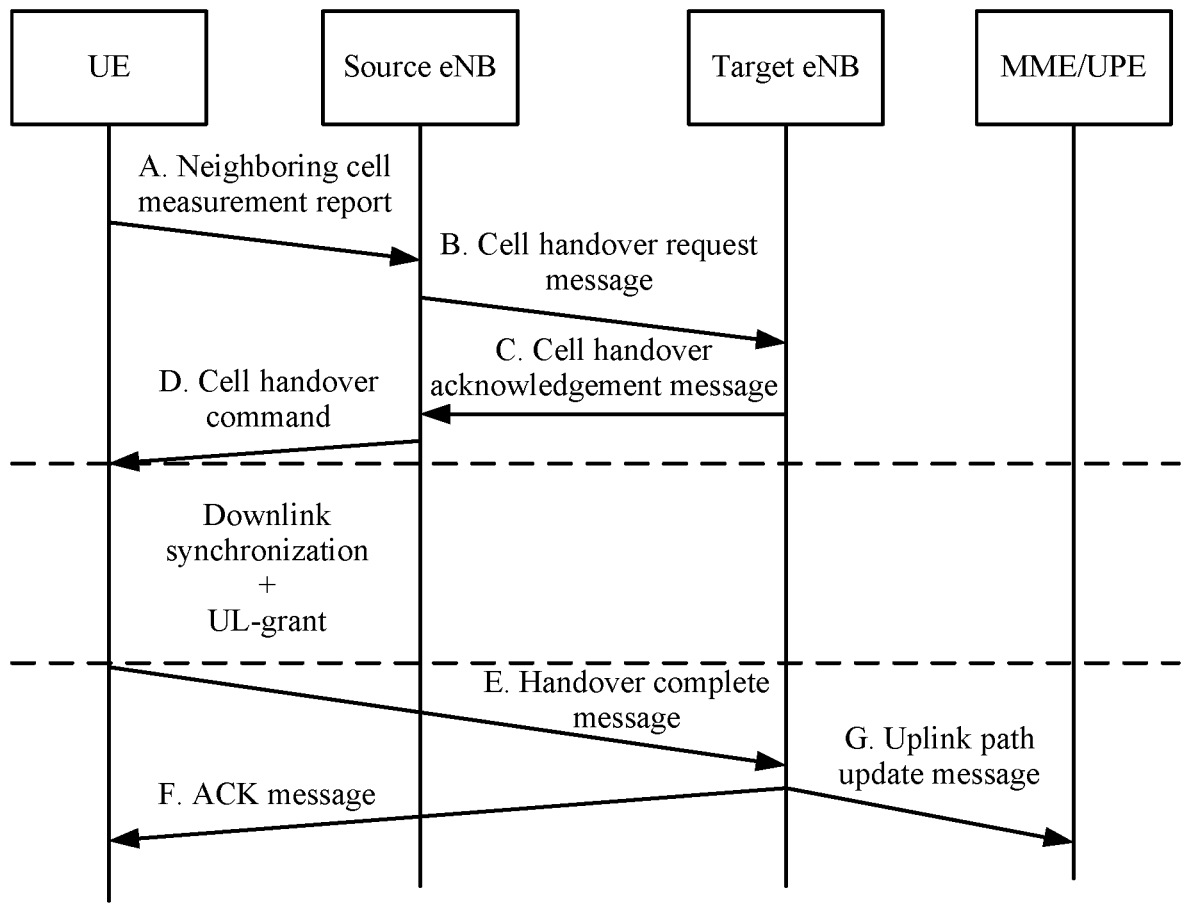
FIG. 1 is a flowchart of a cell handover procedure.
Figure 2:
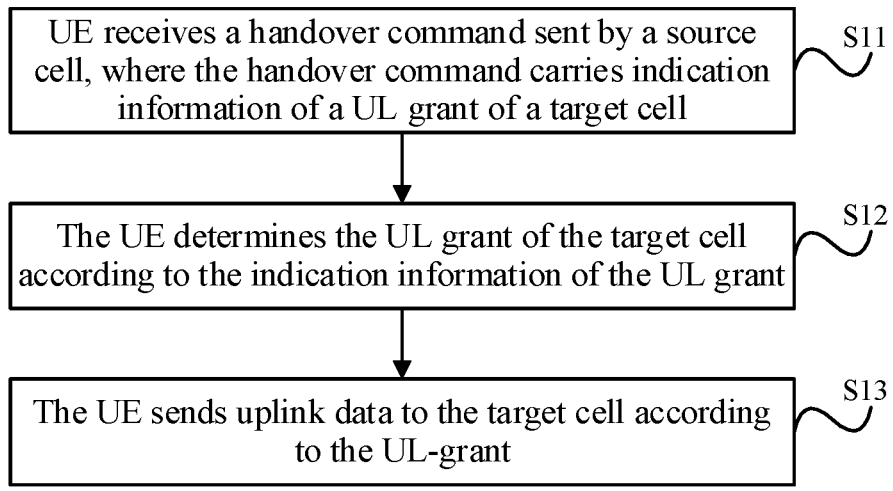
FIG. 2 is a flowchart of a cell handover method according to Embodiment 1.

FIG. 2 is a flowchart of a cell handover method according to Embodiment 1. The method is executed by UE. The method includes the following main blocks.

Block S11. The UE receives a handover command sent by a source cell, where the handover command includes indication information of a UL grant of a target cell.

When the source cell determines that the UE should perform cell handover, the source cell sends the handover command to the UE, and adds the indication information of the UL grant to the handover command sent to the UE.

Block S12. The UE determines a UL grant of the target cell according to the UL grant the indication information of the UL grant.

After receiving the handover command sent by the source cell, the UE obtains the UL grant of the target cell according to the UL grant the indication information of the UL grant in the handover command.

Block S13. The UE sends uplink data to the target cell according to the UL grant.

After determining the UL grant of the target cell, the UE sends the uplink data to the target cell according to a requirement. The sent uplink data includes at least one of the following: a handover complete message, a buffer status report, or service data.

In this embodiment, the UE receives the handover command sent by the source cell and may directly determine the UL grant of the target cell according to the UL grant the indication information of the UL grant carried in the handover command. This skips a random access procedure and therefore reduces a transmission interruption time of the UE in a cell handover procedure.

Figure 3:
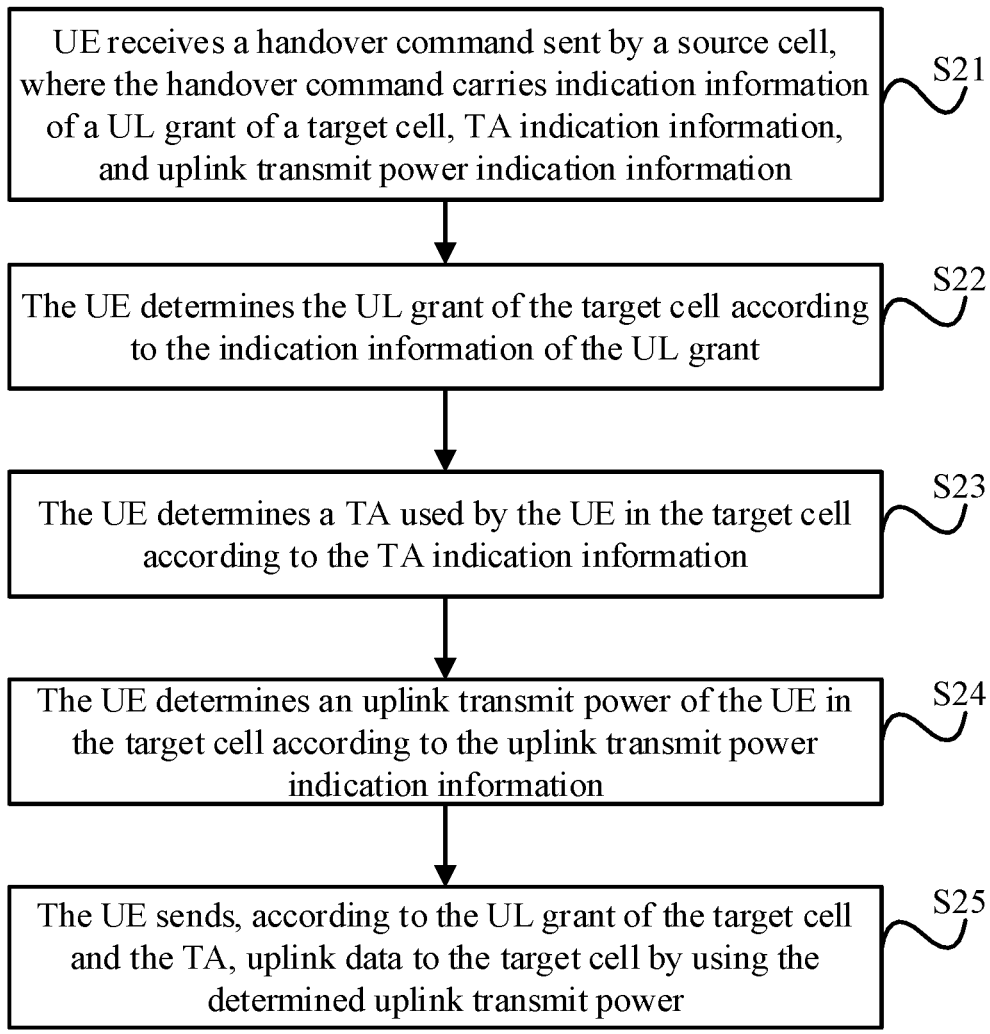
FIG. 3 is a flowchart of a cell handover method according to Embodiment 2.

FIG. 3 is a flowchart of a cell handover method according to Embodiment 2. The method is executed by UE. The method includes the following main processing blocks.

Block S21. The UE receives a handover command sent by a source cell, where the handover command includes indication information of a UL grant of a target cell, TA (timing advance) indication information, and uplink transmit power indication information.

To complete a cell handover procedure, the UE obtains a UL grant of the target cell and also should obtain a TA used by the UE in the target cell and an uplink transmit power for sending data to the target cell by the UE.

The TA, used in the target cell, to be obtained by the UE and the uplink transmit power for sending data to the target cell by the UE may be preconfigured on the UE. When the UE should perform cell handover, the UE may directly use preconfigured data.

To properly configure a communication policy between the UE and the target cell, in this embodiment, the source cell uses indication information to inform the UE of the TA used during communication in the target cell and of the uplink transmit power for sending data to the target cell.

In this embodiment, the handover command carrying both the TA indication information and the uplink transmit power indication information is used as an example for description. A person skilled in the art may understand that, in a specific implementation of this solution, the handover command sent by the source cell may carry any one of the TA indication information and the uplink transmit power indication information. Information not carried in the handover command may be obtained in another manner, for example, preconfigured on the UE. This implementation is not further described in this embodiment.

Block S22. The UE determines a UL grant of the target cell according to the indication information of the UL grant.

Block S23. The UE determines a TA used by the UE in the target cell according to the TA indication information.

Block S24. The UE determines an uplink transmit power of the UE in the target cell according to the uplink transmit power indication information.

The blocks S22-S24 are not subject to a specific sequence. In this embodiment, the blocks S22-S24 are in ascending order to describe the technical solutions.

Block S25. The UE sends, according to the UL grant of the target cell and the TA, uplink data to the target cell by using the determined uplink transmit power.

After determining the UL grant, the TA, and the uplink transmit power of the target cell, the UE monitors a downlink synchronization signal of the target cell, completes downlink synchronization with the target cell, and sends the uplink data to the target cell.

Specifically, the UE determines, according to the UL grant of the target cell, an amount of data that can be transmitted, and sends one or more of a handover complete message, a buffer status report, or service data to the target cell according to the data amount that can be transmitted.

In this embodiment, the UE obtains the indication information of the UL grant, the TA indication information, and the uplink transmit power indication information of the target cell from the handover command of the source cell, and determines the UL grant, the TA, and the uplink transmit power of the target cell according to the corresponding indication information, without a need to use a random access procedure of the target cell to obtain the information. This skips the random access procedure, shortens a UE-side data transmission interruption time in the cell handover procedure, reduces a data transmission delay, and improves user experience.

Figure 4:
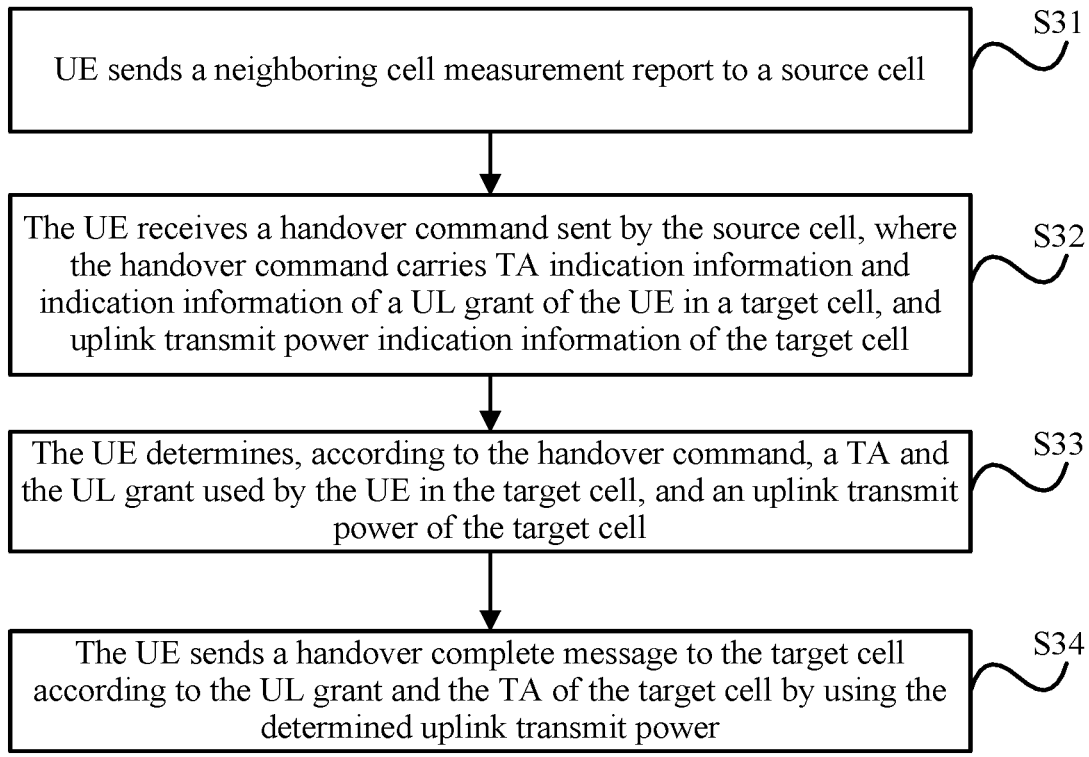
FIG. 4 is a flowchart of a cell handover method according to Embodiment 3.

FIG. 4 is a flowchart of a cell handover method according to Embodiment 3. The method is executed by UE. The method includes the following main processing blocks.

Block S31. The UE sends a neighboring cell measurement report to a source cell.

Figure 5:
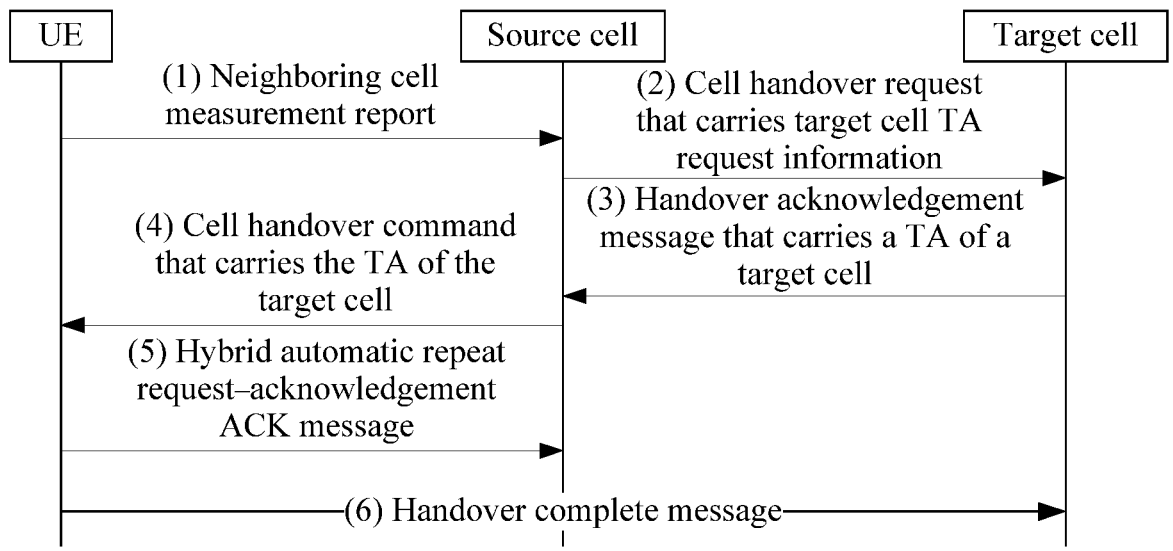
FIG. 5 is a signaling flowchart of how UE obtains a TA of a target cell.

FIG. 5 is a signaling flowchart of how the UE obtains a TA of a target cell. The figure shows the following operations for obtaining the TA of the target cell by the UE.

(1) The UE completes neighboring cell measurement according to a configuration of the source cell, and sends the neighboring cell measurement report (RRC Measurement report) to the source cell.

(2) The source cell determines, according to the neighboring cell measurement report sent by the UE, whether the UE should perform cell handover. If it is determined that the UE should perform cell handover, the source cell sends a cell handover request to the target cell. Optionally, the cell handover request includes target cell TA request information (TA request). It may be understood that if the source cell and the target cell belong to a same base station, the procedure is performed within the base station. The specification is not limited thereto.

(3) The target cell determines, according to the received cell handover request, whether there are sufficient communication resources to be allocated to the UE. If there are sufficient communication resources, the target cell sends a cell handover acknowledgement message (Handover confirm) to the source cell. Optionally, the cell handover acknowledgement message includes the TA (TA value) of the target cell.

In addition, the target cell may further add indication information of a UL grant of the target cell to the cell handover acknowledgement message sent to the source cell.

The target cell or related request information carried in the cell handover request message may determine whether to add the TA and/or the indication information of the UL grant of the target cell to the cell handover acknowledgement message. For example, the target cell adds the TA of the target cell to the cell handover acknowledgement message according to the target cell TA request information carried in the cell handover request information.

In this embodiment, the cell handover acknowledgment message sent by the target cell to the source cell may carry TA indication information of the target cell and the indication information of the UL grant of the target cell.

The source cell generates a handover command according to the handover acknowledge message, and adds the TA indication information, the indication information of the UL grant, and uplink transmit power indication information that are of the target cell to the handover command.

(4) The source cell sends a cell handover command to the UE. The cell handover command is carried in a radio resource reconfiguration message (RRC reconfiguration) sent by the source cell to the UE.

Block S32. The UE receives a handover command sent by the source cell, where the handover command includes TA indication information and indication information of a UL grant of the UE in a target cell, and uplink transmit power indication information of the target cell.

Optionally, after the UE receives the handover command sent by the source cell, the UE sends a hybrid automatic repeat request-acknowledgement message (HARQ Ack) to the source cell, as shown in operation (5) in FIG. 5.

It may be understood that specific information carried in the handover command is determined according to information carried in the handover acknowledgement message sent by the target cell to the source cell. For example, only the indication information of a UL grant is carried, or only the Indication information of a UL grant and the TA indication information are carried. The specification is not limited thereto.

Block S33. The UE determines, according to the handover command, a TA and the UL grant used by the UE in the target cell, and an uplink transmit power of the target cell.

The handover command includes the TA indication information of the target cell. Therefore, the UE may determine the TA of the target cell according to the information carried in the handover command.

When the handover command directly includes the TA of the target cell, the TA indication information is the TA of the target cell.

There are multiple manners of setting or implementing the uplink transmit power indication information carried in the handover command. For example, the uplink transmit power indication information may be the uplink transmit power used by the UE in the target cell. In this case, the UE uses an uplink transmit power used in the source cell as the uplink transmit power used in the target cell.

For another example, the uplink transmit power indication information is offset information of offset based on an uplink transmit power of the source cell. In this case, the UE determines the uplink transmit power in the target cell by performing offset according to the offset information based on the transmit power in the source cell.

For another example, the uplink transmit power indication information is fourth indication information instructing the UE to determine the uplink transmit power of the UE in the target cell according to a downlink signal transmit power and a downlink signal receive power of the target cell.

In this case, a method of determining the uplink transmit power of the target cell by the UE is as follows:

(1) The UE receives, according to the fourth indication information, a cell broadcast message from the target cell, where the cell broadcast message includes the downlink signal transmit power of the target cell.

(2) The UE determines, according to the received cell broadcast message, the downlink signal receive power.

(3) The UE determines, according to the downlink signal transmit power and the downlink signal receive power, a downlink path loss value of the target cell.

(4) The UE determines, according to the downlink path loss value and a preset receive power expected by the target cell, the uplink transmit power of the UE in the target cell.

Similarly, there are multiple manners of implementing the indication information of the UL grant of the target cell. For example, the indication information of the UL grant includes the UL grant and UL grant effective time information of the target cell, so that the UE may directly determine the UL grant and a UL grant effective time of the target cell.

In another implementation, the indication information of the UL grant of the target cell may include PDCCH (physical downlink control channel) monitoring indication information used to instruct the UE to monitor a PDCCH of the target cell.

In this implementation, operations for determining the UL grant of the target cell by the UE according to the UL grant the indication information of the UL grant include:

(1) The UE monitors the PDCCH according to the PDCCH monitoring indication information.

(2) The UE determines, according to DCI (downlink control information) transmitted on the detected PDCCH, the UL grant of the target cell.

Block S34. The UE sends a handover complete message to the target cell according to the UL grant and the TA of the target cell by using the determined uplink transmit power. This block is operation (6) in FIG. 5.

In this embodiment, the UE obtains the TA and the UL grant used in the target cell from the handover command sent by the source cell, and determines the uplink transmit power of the UE in the target cell according to the uplink transmit power indication information in the handover command. This skips a random access procedure and shortens a data transmission interruption time in a cell handover procedure.

The following describes in detail a procedure of obtaining the UL grant of the UE in the target cell with reference to accompanying drawings.

Figure 6:
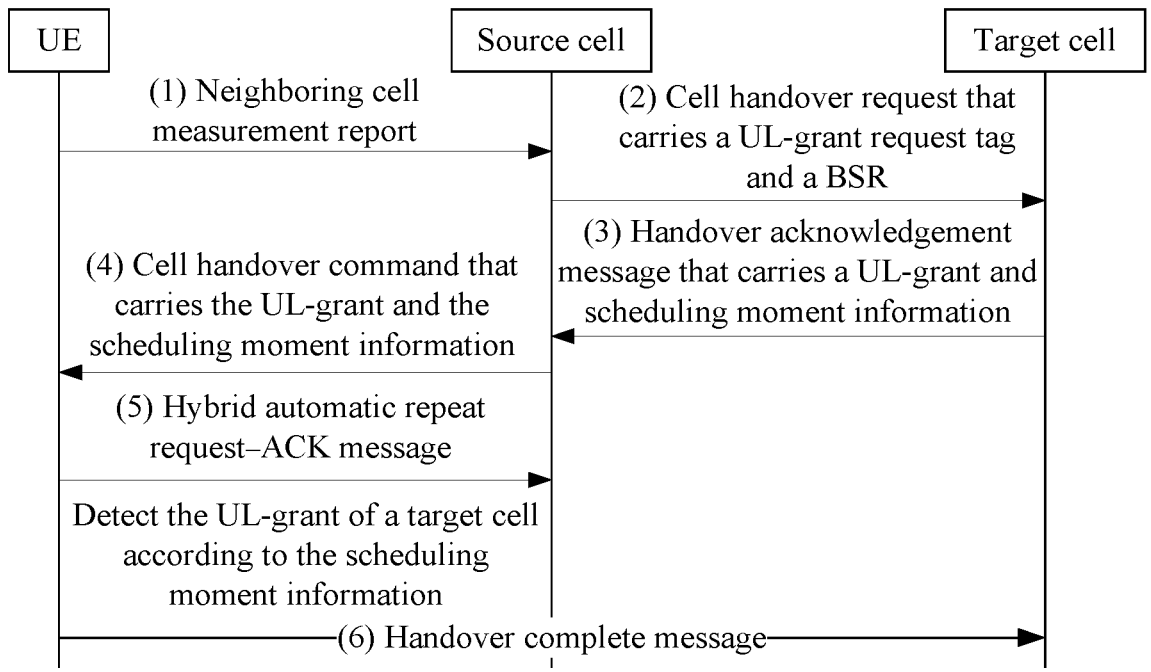
FIG. 6 is a flowchart of how UE obtains a UL grant of a target cell in a first manner.

FIG. 6 is a flowchart of how the UE obtains the UL grant of the target cell in a first manner. The flowchart includes:

In this manner, the handover acknowledgement message sent by the target cell to the source cell includes the UL grant information of the target cell, and the UL grant information may include the UL Grant of the target cell. Specifically, the UL Grant includes physical resources such as a physical resource block (PRB), a modulation and coding scheme, redundancy version, and other information.

Further, optionally, the UL grant information may further include period information. The period information is used to indicate a period of the UL Grant. For example, if a period is set to 1 ms, one subframe, or one TTI, it indicates that the UE may use the UL Grant every 1 ms, every one subframe, or every one TTI. If the period is set to 2 ms, two subframes, or two TTIs, it indicates that the UE may use the UL Grant every 2 ms, every two subframes, or every two TTIs.

Further, optionally, the UL grant information may further include offset information. The offset information is used to indicate UL Grant moments. For example, the UE may use the UL Grant at which moments. For example, if the offset information is 1 And the period is 2 ms, it indicates that the UE may use the UL Grant in a subframe 1, a subframe 3, and a subframe 5. A specific calculation formula is as follows:

$$[(\text{radio frame number}*10)+\text{subframe number}] \bmod (\text{period})=(\text{offset})\bmod(\text{period})$$

Further, optionally, the UL grant information may further include UL Grant effective time information. The UL Grant effective time information is used to indicate that the UL Grant takes effect after the UE receives the handover command and a T1 time has elapsed, or is used to indicate that the UL Grant takes effect after the target cell sends the handover acknowledgement message to the source cell and a T2 time has elapsed. For example, after the target cell allocates the UL grant, considering a subsequent processing delay, the target cell may instruct the UL grant to take effect after the handover acknowledgement message is sent and a period T2 of time has elapsed.

Further, optionally, the UL grant information may further include UL Grant duration information. UL Grant duration is used to indicate valid duration of the UL grant or a valid quantity of times of transmission. The valid duration is 10 frames or the valid quantity of times is 10 times. That is, the UL grant fails after 10 consecutive frames counting from a first valid frame, or fails after 10 consecutive subframes counting from a first valid subframe. Alternatively, the UL Grant duration is used to indicate that the UL grant is valid before a T3 time. For example, the T3 time is a handover completion command sending moment, or a sending success moment of a UE handover acknowledgement completion command, or a moment whose radio frame number is 10 and subframe number is 3.

The source cell sends the UL grant information to the UE by using a handover command message.

After receiving the handover command message, the UE determines the UL Grant used in the target cell according to one or more of the UL grant information, the UL Grant of the target cell, the period information, the offset information, the effective time information, or the duration information, and sends at least one of a buffer status report, a handover complete message, or service data according to the UL Grant.

The foregoing UL grant configuration manner can minimize time of UE waiting for an uplink resource, and can more quickly obtain a resource for sending a handover complete message.

A time-frequency resource is configured in an SPS (Semi-Persistent-Scheduling, semi-persistent scheduling) manner, and an SPS configuration validity period is provided. The validity period may be determined based on the BSR (buffer status report) of the UE previously sent by the source cell to the target cell. Specific operations include:

(1) The UE completes neighboring cell measurement according to a configuration of the source cell, and sends a neighboring cell measurement report (RRC Measurement report) to the source cell.

(2) The source cell determines, according to the neighboring cell measurement report sent by the UE, whether the UE should perform cell handover. If it is determined that the UE should perform cell handover, the source cell sends a cell handover request to the target cell. Optionally, the handover request message may carry a UL grant request flag and BSR information last reported by the UE, to indicate that the target cell is expected to instruct to apply the UL grant information for fast handover. The BSR information helps the target cell to allocate an appropriate uplink communication resource to the UE.

(3) The target cell determines, according to the received cell handover request, whether there are sufficient communication resources to be allocated to the UE. If there are sufficient communication resources, the target cell sends a cell handover acknowledgement message (Handover confirm) to the source cell.

The handover acknowledgement message includes the UL grant and scheduling moment information of the target cell. Optionally, a group of scheduling moment combination, the valid duration or the valid quantity of times of transmission may be set. For example, the UL grant may be instructed to take effect in a subframe 2 and a subframe 7 in each frame, or the valid duration is 10 frames or the valid quantity of times is 10 times. That is, the UL grant fails after 10 consecutive frames counting from a first valid frame, or fails after 10 consecutive subframes counting from a first valid subframe.

(4) A source base station obtains the UL grant and SPS scheduling moment information of the target cell and sends them by using a handover command to the UE.

(5) The UE sends a hybrid automatic repeat request ACK message to the source cell and disconnects from the source cell.

(6) After downlink synchronization with the target cell is complete, the UE sends a handover complete message according to an SPS scheduling moment and the UL grant information, and sends uplink data that is not completely sent previously on a subsequent possible SPS scheduling resource. The target cell detects, on a UL grant resource, at an SPS moment, allocated by a corresponding cell, whether the uplink data of the to-be-handed-over UE arrives. If the data arrives, an SPS validity period starts. An end moment of SPS resource allocation is determined by the target cell according to a UE service type and an amount of to-be-transmitted data. The UL grant configuration in a semi-persistent-scheduling manner can minimize time of UE waiting for an uplink resource, and can more quickly obtain a resource for sending a handover complete message.

Figure 7:
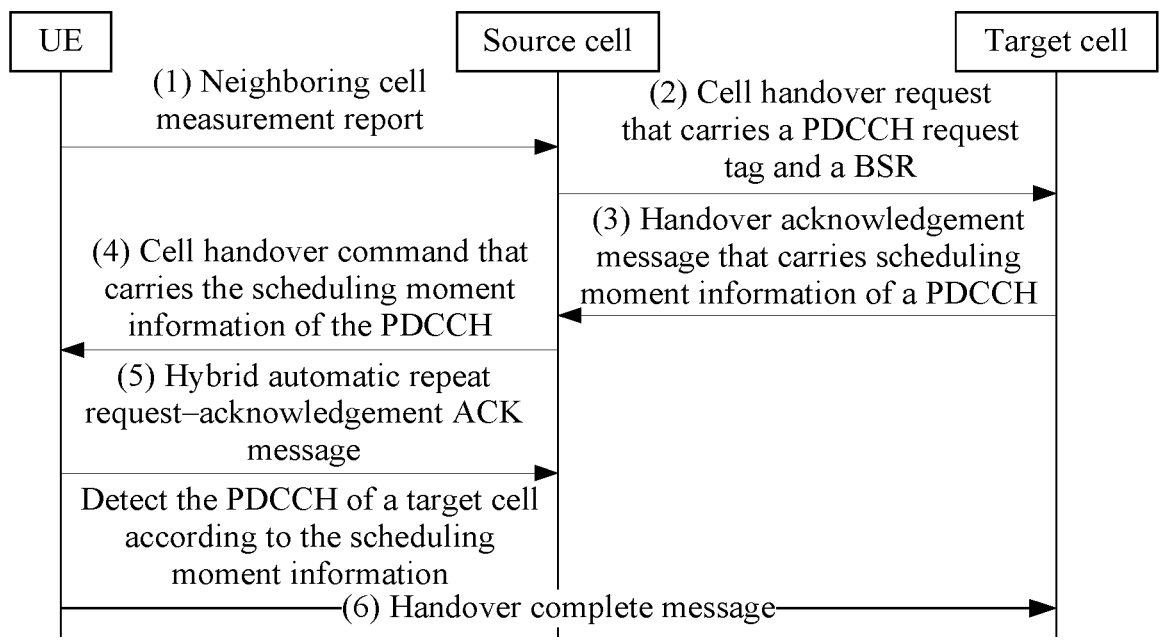
FIG. 7 is a flowchart of how UE obtains a UL grant of a target cell in a second manner.

FIG. 7 is a flowchart of how the UE obtains the UL grant of the target cell in a second manner.

In this manner, the handover acknowledgement message sent by the target cell to the source cell includes the UL grant information of the target cell, and the UL grant information may include information instructing the UE to monitor a PDCCH of the target cell.

Further, optionally, the UL grant information may further include period information. The period information is used to indicate a period of monitoring the PDCCH of the target cell by the UE. For example, if a period is set to 1 ms, one subframe, or one TTI, it indicates that the UE may monitor the PDCCH of the target cell every 1 ms, every one subframe, or every one TTI. If the period is set to 2 ms, two subframes, or two TTIs, it indicates that the UE may monitor the PDCCH of the target cell every 2 ms, every two subframes, or every two TTIs.

Further, optionally, the UL grant information may further include offset information. The offset information is used to indicate moments at which the UE monitors the PDCCH of the target cell. For example, the UE may monitor the PDCCH of the target cell at which moments. For example, if the offset information is 1 and the period is 2 ms, it indicates that the UE may monitor the PDCCH of the target cell in a subframe 1, a subframe 3, and a subframe 5. A specific calculation formula is as follows:

$$[(\text{radio frame number}*10)+\text{subframe number}] \bmod (\text{period}) = (\text{offset}) \bmod (\text{period})$$

Further, optionally, the UL grant information may further include effective time information of monitoring the PDCCH of the target cell by the UE. The effective time information of monitoring the PDCCH of the target cell by the UE is used to indicate that the UE starts to monitor the PDCCH of the target cell after the UE receives the handover command and a T1 time has elapsed, or is used to indicate that the UE starts to monitor the PDCCH of the target cell after the target cell sends the handover acknowledgement message to the source cell and a T2 time has elapsed.

Further, optionally, the UL grant information may further include duration information of monitoring the PDCCH of the target cell by the UE. Duration of monitoring the PDCCH of the target cell by the UE is used to indicate valid duration of monitoring the PDCCH of the target cell by the UE or a valid quantity of times of transmission. The valid duration is 10 frames or the valid quantity of times is 10 times. That is, the UE fails to monitor the PDCCH of the target cell after 10 consecutive frames counting from a first valid frame, or fails after 10 consecutive subframes counting from a first valid subframe. Alternatively, the duration of monitoring the PDCCH of the target cell by the UE is used to indicate that the UE starts to monitor the PDCCH of the target cell before a T3 time. For example, the T3 time is a handover completion command sending moment, or a sending success moment of a UE handover acknowledgement completion command, or a moment whose radio frame number is 10 and subframe number is 3.

Further, optionally, the Indication information of a UL grant may further include a radio network temporary identifier RNTI, such as a C-RNTI or an SPS-RNTI, which is used when the UE monitors the PDCCH of the target cell.

The source cell sends the UL grant information to the UE by using a handover command message.

After receiving the handover command message, the UE monitors the PDCCH of the target cell according to one or more of the UL grant information, the UL Grant of the target cell, the period information, the offset information, the effective time information, or the duration information, determines the UL Grant according to the DCI transmitted on the PDCCH, and sends at least one of a buffer status report, a handover complete message, or service data according to the UL Grant.

The foregoing UL grant configuration manner can minimize time of UE waiting for an uplink resource, and can more quickly obtain a resource for sending a handover complete message.

Optionally, a handover message of the source cell indicates SPS information of the PDCCH of the target cell. The UE detects the PDCCH in the target cell according to an indication, and sends the handover complete message according to the Indication information of a UL grant in the DCI.

Specific operations include:

(1) The UE completes neighboring cell measurement according to a configuration of the source cell, and sends the neighboring cell measurement report (RRC Measurement report) to the source cell.

(2) The source cell determines, according to the neighboring cell measurement report sent by the UE, whether UE should perform cell handover. If it is determined that the UE should perform cell handover, the source cell sends a cell handover request to the target cell. The handover request message may carry a PDCCH request flag and BSR information last reported by the UE, to indicate that a target eNB is expected to instruct to apply PDCCH information for fast handover. The BSR information helps the target cell to allocate an appropriate uplink communication resource to the UE.

(3) The target cell determines, according to the received cell handover request, whether there are sufficient communication resources to be allocated to the UE. If there are sufficient communication resources, the target cell sends a cell handover acknowledgement message (Handover confirm) to the source cell.

The handover acknowledgement message includes scheduling moment information of the PDCCH of the target cell.

Considering a subsequent processing delay upon receipt of the handover acknowledgement message, the target cell may instruct the PDCCH to take effect after a period of time T when a handover acknowledgement command is sent. Uncertain transmission quality of a radio link may cause a handover-related message to be retransmitted. To ensure that a resource indicated by the PDCCH can be used by the UE, the time T may be set to a relatively long time. This prolongs a data interruption time. Therefore, another possible resource allocation manner is semi-persistent scheduling. That is, a group of scheduling moment combination and a validity period indication may be set, and this is similar to the first manner. For example, the PDCCH is detected in a subframe 2 and a subframe 7 in each frame, a validity period is 10 frames, or the valid quantity of times is 10 times.

(4) A source base station obtains SPS scheduling moment information of the PDCCH and sends it by using a handover command to the UE.

(5) The UE sends a hybrid automatic repeat request ACK message to the source cell and disconnects from the source cell.

(6) After downlink synchronization with the target cell is complete, the UE detects the PDCCH according to the SPS scheduling moment information, obtains the UL grant from the DCI transmitted on the PDCCH, sends a handover complete message on a resource indicated by the UL grant, and continues to detect the PDCCH on a subsequent possible SPS resource of the PDCCH. The target cell detects, on a UL grant resource, indicated by the PDCCH at an SPS moment, allocated by a corresponding cell, whether the uplink data of the to-be-handed-over UE arrives. If the data arrives, an SPS validity period starts. An end moment of SPS resource allocation is determined by the target cell according to a UE service type and an amount of to-be-transmitted data. Compared with the first manner, in this manner, the target cell does not need to indicate the UL grant in the handover acknowledgement command, that is, does not need to pre-allocate a specific uplink resource. The target cell may allocate a UL grant resource according to a current scheduling status after the UE verifies receipt of the handover command delivered by the source cell and the source cell notifies the target cell of successful sending of the handover command. This leads to flexible resource utilization. For a scenario in which the target cell indicates the UL grant to the UE through the PDCCH, after sending the PDCCH information, the target cell detects whether there is an uplink signal sent by the UE on a time-frequency resource corresponding to the UL grant information. The target cell may determine whether there is data sent by the UE by detecting an uplink DMRS (demodulation reference signal). If the target cell detects the DMRS, the UE sends the data. If the target cell cannot detect the DMRS, the UE does not transmit the data.

If the UE does not send the data on the time-frequency resource indicated by the UL grant, two possible causes are as follows: The UE fails to detect the PDCCH information, or although the UE successfully obtains the UL grant information, the UE has no data to send (or the data is not ready).

This embodiment provides a method of identifying a cause (one of the foregoing two causes) why the UE does not send the data on the time-frequency resource indicated by the UL grant. That is, when the UE receives the UL grant information on the PDCCH but has no data to send, the UE may not send padding over a PUSCH (physical uplink shared channel), and instead the UE feeds back ACK (acknowledgment) information over a PUCCH (physical uplink control channel), or sends a pilot by using a preconfigured cyclic shift value on the time-frequency resource indicated by the UL grant. This procedure is specifically described as follows:

Prerequisites: The target cell determines whether the UE has sent the data by detecting whether the uplink DMRS signal exists. The UL grant information includes 3-bit information that indicates a cyclic shift value (ranging from 0-7) used by the DMRS. For a resource allocated in an SPS manner, 3-bit information indicating a cyclic shift value used by the DMRS in an SPS activation command is all zeros, and it indicates that the cyclic shift value used by the DMRS is 0. The target cell detects a DMRS signal in a pilot detection window corresponding to the cyclic shift value. If signal energy exceeds a given threshold, the target cell determines that a UE has sent an uplink signal. If the signal energy is lower than the given threshold, the target cell determines that the UE does not send data.

A specific procedure is as follows: When the UE receives the UL grant information indicated by the PDCCH. If there is no data to be sent, the UE may use one of the following two methods to feed back information to a cell, so that the cell verifies that the PDCCH is successfully received.

Method 1: The UE feeds back the ACK information to the target cell on the PUCCH channel. When the UE receives downlink data sent by the target cell on a PDSCH channel in a subframe n, the UE should feed back ACK/NACK (negative acknowledgement) information to the target cell on the PUCCH channel in a subframe n+4. In addition, the 3GPP protocol TS36.213 defines that a used PUCCH resource index is in a one-to-one correspondence with a CCE (control channel element) index of PDCCH information indicating the PDSCH (physical downlink shared channel). The CCE index of the PDCCH is unique in a subframe. Therefore, the ACK/NACK feedback mode is extended to uplink transmission in this embodiment, that is, when the PDCCH is used to indicate a UL grant of uplink transmission, ACK is also sent on a corresponding PUCCH resource, to indicate to the cell that the UE normally receives a PDCCH indication but there is no data to be sent at this time. If the cell fails to detect the corresponding DMRS on an uplink resource corresponding to the UL Grant indicated by the PDCCH, and fails to detect the ACK on the corresponding PUCCH resource, it is determined that the UE fails to detect the PDCCH. Otherwise, it is determined that the UE successfully detects the PDCCH.

Method 2: The UE sends a DMRS pilot signal on the time-frequency resource indicated by the UL grant. The DMRS pilot signal uses a preconfigured cyclic shift value. The preconfigured cyclic shift value is different from a cyclic shift value used when the UE sends data. On the PUSCH channel, one subframe has two symbols for sending a DMRS, and the UL grant includes 3-bit information that indicates the cyclic shift value used by the DMRS. In this embodiment, the UE sends DMRS pilot code corresponding to different cyclic shift values on a same DMRS timefrequency resource. If the target cell detects the DMRS in a corresponding DMRS detection window, it is determined that the UE successfully receives the PDCCH but there is no data at this time. If the target cell fails to detect the DMRS, it is determined that the UE fails to detect the PDCCH.

One of the foregoing two determining methods may be specifically selected according to a configuration in RRC signaling or the UL grant information.

In the second method, the preconfigured cyclic value may be configured by the target cell (by means of RRC signaling or the UL grant information) to a specific DMRS cyclic shift value, or configured to an offset value. In this case, a cyclic shift value finally used for feedback is: (an original cyclic shift value+the offset value) modulo 8. If the preconfigured cyclic value is configured in the UL Grant, new bit information may be used to indicate that the DMRS cyclic shift value is used when there is no data.

When the UE receives the UL grant information indicated by the PDCCH, if there is no data to be sent, feedback is sent to the cell by using one of the foregoing methods, and then the ACK/NACK information fed back by a PHICH channel does not need to be detected. In addition, after the cell delivers the UL grant information, if the cell fails to detect indicated DMRS information but detects feedback information sent by using one of the foregoing two methods, the cell does not need to feed back the ACK/NACK information on the PHICH channel.

The methods described above are not limited only to a handover scenario, and may be expanded to all scenarios of indicating the UL grant by the PDCCH. For example, during communication between UE and a serving cell, if the UE detects a PDCCH but does not send data, the foregoing methods may be used to notify the cell of successful receiving of the PDCCH. The specification is not limited thereto.

In addition, because a base station preallocates an uplink resource in the foregoing methods, the resource is wasted when the UE has no uplink data. Therefore, the specification provides another method to improve resource utilization.

Specifically, the base station allocates a same UL Grant to two or more UEs. Different UEs use different DMRSs to send respective data. The different DMRSs may be indicated by using an RRC message or a UL Grant. A specific method is the same as that in the foregoing embodiment.

When the base station detects multiple DMRSs on a resource corresponding to the UL Grant, but fails to decode and obtain any data, it indicates that there is a conflict. In this case, the base station may allocate a dedicated UL Grant to the corresponding UE according to the detected DMRSs, to instruct the UE to perform adaptive retransmission. Alternatively, the base station feeds back NACK on a PHICH channel, to instruct the UE to perform non-adaptive retransmission. In this case, the base station can instruct a maximum of one UE to perform non-adaptive retransmission, to avoid another conflict during retransmission.

The foregoing method allows multiple UEs to share a same uplink resource, thereby improving resource utilization. In addition, DMRS-based detection may avoid a conflict during retransmission and reduce a data transmission delay.

This embodiment provides a method of identifying a cause why the UE does not send the data on the timefrequency resource indicated by the UL grant. In the handover scenario, if the cell determines that the UE fails to receive the PDCCH information, a downlink channel condition may be poor, and the cell should take measures to increase downlink PDCCH detection performance to ensure that a handover procedure is smoothly completed. If the cell determines that the UE has no data to be sent, no special operation is required. In addition, after receiving the UL grant, the UE does not send data when there is no data to be sent. Compared with a method of sending an unwanted random number, this method can reduce inter-cell interference and reduce UE power consumption.

Figure 8:
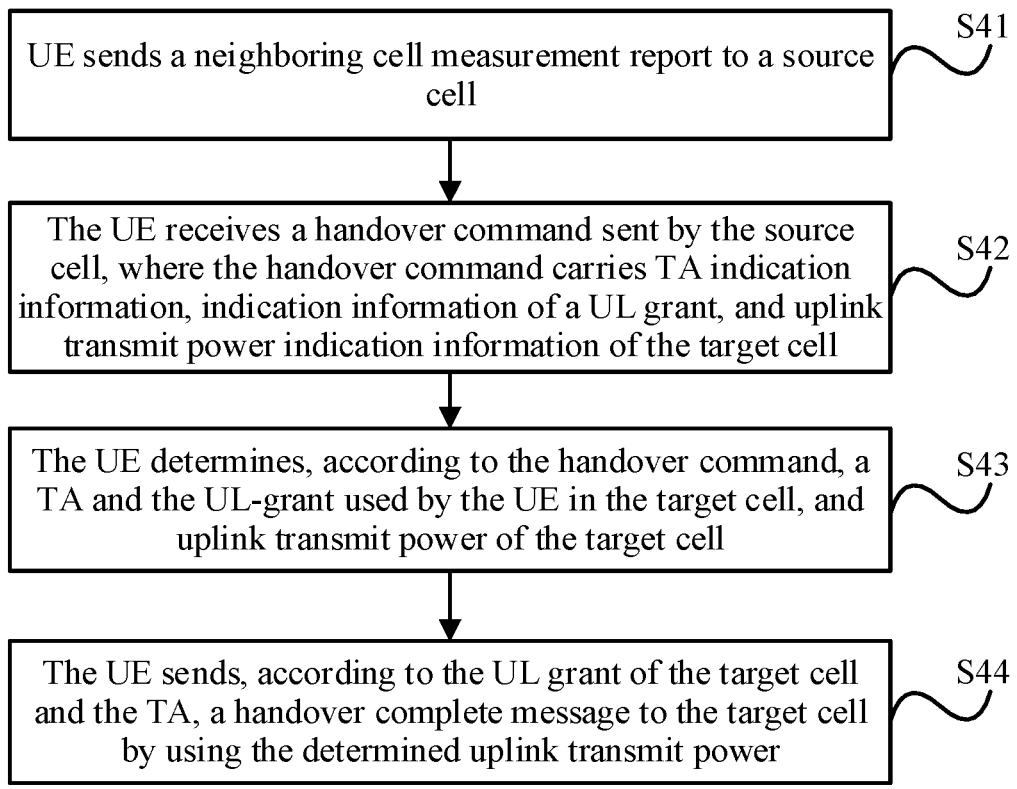
FIG. 8 is a flowchart of a cell handover method according to Embodiment 4.

FIG. 8 is a flowchart of a cell handover method according to Embodiment 4. The method is executed by UE. The method includes the following blocks.

Block S41. The UE sends a neighboring cell measurement report to a source cell.

The UE completes neighboring cell measurement according to a configuration of the source cell, and sends the neighboring cell measurement report to the source cell.

The source cell determines, according to the neighboring cell measurement report sent by the UE, whether the UE should perform cell handover. If the source cell determines that cell handover should be performed, the source cell sends a cell handover request to a target cell.

The target cell determines, according to the received cell handover request, whether there are sufficient communication resources to be allocated to the UE. If there are sufficient communication resources, the target cell sends a cell handover acknowledgement message to the source cell.

In this embodiment, the handover acknowledgement message includes indication information of a UL grant. Preferably, the handover request message sent by the source cell to the target cell includes target cell UL grant request information.

In this embodiment, the target cell determines TA indication information of the UE in the target cell according to an actual communication scenario between the target cell and the source cell, and sends the TA indication information to the UE by using the source cell.

A specific determining method includes: determining, by the target cell, whether the source cell and the target cell are in a coordinated multipoint transmission COMP communication scenario. If the source cell and the target cell are in a COMP communication scenario, the target cell determines that the TA indication information is first indication information indicating that a TA of the target cell is the same as a TA of the source cell.

Optionally, the target cell may further determine an uplink transmit power of the UE in the target cell according to a communication requirement of the UE, and generate, according to a determining result, uplink transmit power indication information. For example, the target cell uses an uplink transmit power used by the UE in the source cell as the transmit power of the UE in the target cell.

The source cell generates a handover command according to the handover acknowledge message sent by the target cell, and adds the TA indication information, the indication information of the UL grant, and the uplink transmit power indication information of the target cell to the handover command. For details about a specific method, refer to the foregoing embodiment. Details are not described herein again.

Block S42. The UE receives a handover command sent by the source cell, where the handover command includes TA indication information, indication information of a UL grant, and uplink transmit power indication information of the target cell.

Block S43. The UE determines, according to the handover command, a TA and the UL grant used by the UE in the target cell, and an uplink transmit power of the target cell.

In this embodiment, the UE uses, according to the TA indication information, the TA of the source cell as the TA of the target cell.

In this embodiment, a manner of determining, by the UE according to the uplink transmit power indication information, the uplink transmit power used by the UE in the target cell is the same as that in Embodiment 3. Details are not described herein again.

In this embodiment, a manner and an implementation procedure of determining, by the UE according to the UL grant the indication information of the UL grant, the UL grant of the target cell are the same as those in Embodiment 3. Details are not described herein again.

Block S44. The UE sends, according to the UL grant of the target cell and the TA, a handover complete message to the target cell by using the determined uplink transmit power.

In this embodiment, the UE obtains the UL grant of the target cell according to the handover command sent by the source cell, uses the TA of the source cell as the TA of the target cell, and determines the uplink transmit power of the UE in the target cell according to the uplink transmit power indication information in the handover command. This skips a random access procedure and shortens a data transmission interruption time in a cell handover procedure.

Figure 9:
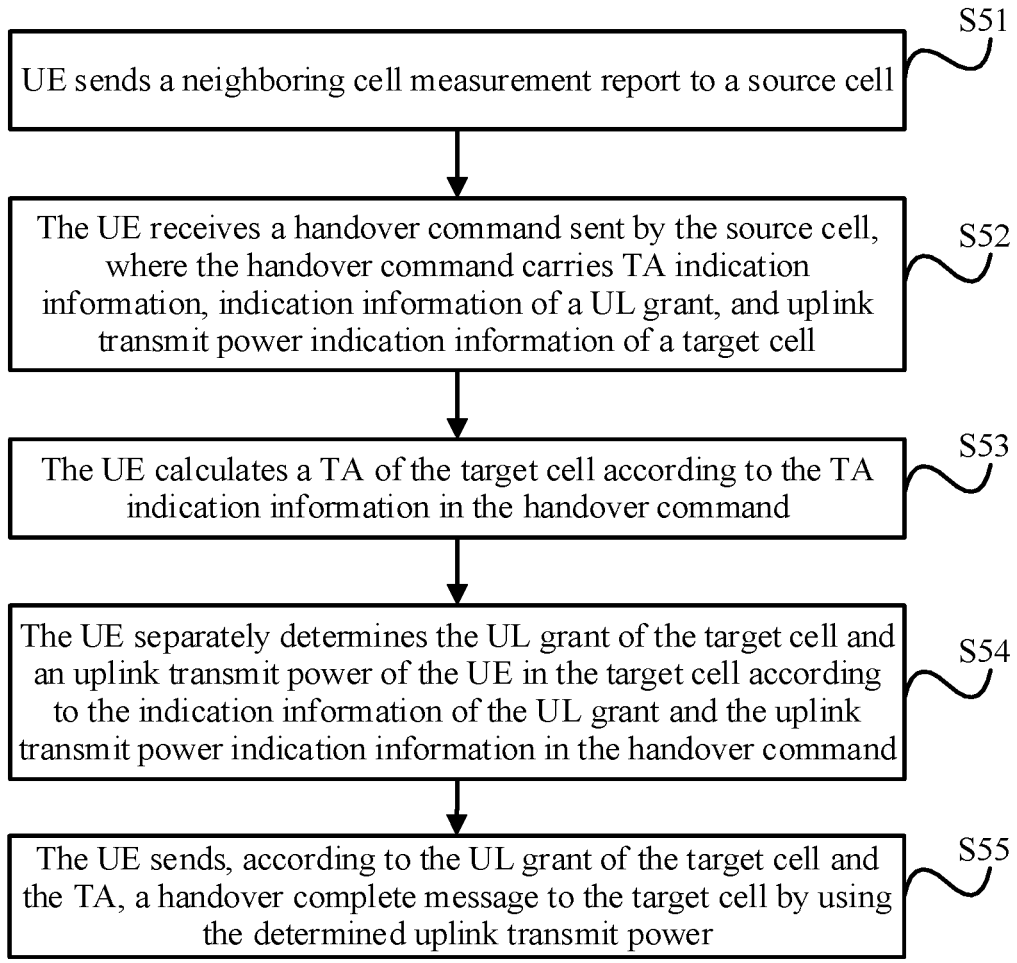
FIG. 9 is a flowchart of a cell handover method according to Embodiment 5.

FIG. 9 is a flowchart of a cell handover method according to Embodiment 5. The method is executed by UE. The method includes the following blocks.

Block S51. The UE sends a neighboring cell measurement report to a source cell.

The UE completes neighboring cell measurement according to a configuration of the source cell, and sends the neighboring cell measurement report to the source cell.

The source cell determines, according to the neighboring cell measurement report sent by the UE, whether the UE should perform cell handover. If the source cell determines that cell handover should be performed, the source cell sends a cell handover request to a target cell.

The target cell determines, according to the received cell handover request, whether there are sufficient communication resources to be allocated to the UE. If there are sufficient communication resources, the target cell sends a cell handover acknowledgement message to the source cell.

In this embodiment, the handover acknowledgement message includes indication information of a UL grant. Preferably, the handover request message sent by the source cell to the target cell includes target cell UL grant request information.

In this embodiment, the target cell uses second indication information instructing to calculate a TA of the target cell based on a TA of the source cell as the TA indication information of the target cell.

Optionally, the TA indication information of the target cell may further include downlink signal sending moment information. Specifically, the downlink signal sending moment information may indicate a downlink signal sending moment of the source cell and a downlink signal sending moment of the target cell, or indicate a difference between the downlink signal sending moment of the source cell and the downlink signal sending moment of the target cell, or indicate that the downlink signal sending moment of the source cell is the same as the downlink signal sending moment of the target cell.

In this embodiment, the downlink signal sending moment information of the source cell and the target cell is determined in the following manners.

Manner 1: If a downlink signal of the source cell and a downlink signal of the target cell are synchronized, it is determined that the downlink signal sending moment information is third indication information indicating that the downlink signal of the source cell and the downlink signal of the target cell are synchronization signals.

Manner 2: If the downlink signal sending moment of the source cell is different from the downlink signal sending moment of the target cell, the cell handover request sent by the source cell to the target cell includes downlink signal sending moment request information of the target cell, and the received cell handover acknowledgement message includes the downlink signal sending moment of the target cell.

In this case, the source cell may determine the downlink signal sending moment of the source cell and the downlink signal sending moment of the target cell as the downlink signal sending moment information of the source cell and the target cell.

Alternatively, the source cell determines the difference between the downlink signal sending moment of the source cell and the downlink signal sending moment of the target cell as the downlink signal sending moment information of the source cell and the target cell.

In addition, the source cell may further determine an uplink transmit power of the UE in the target cell according to a communication requirement of the UE, and generate, according to a determining result, uplink transmit power indication information. For example, the source cell uses an uplink transmit power used by the UE in the source cell as the transmit power of the UE in the target cell.

The source cell generates a handover command, and adds the TA indication information, the indication information of the UL grant, and the uplink transmit power indication information of the target cell to the handover command.

Block S52. The UE receives a handover command sent by the source cell, where the handover command includes TA indication information, indication information of a UL grant, and uplink transmit power indication information of a target cell.

Block S53. The UE calculates a TA of the target cell according to the TA indication information in the handover command.

A method of calculating the TA of the target cell by the UE includes:

(1) When the UE determines, according to the downlink signal sending moment information, that the downlink signal of the source cell and the downlink signal of the target cell are synchronized:

A. The UE separately detects, according to the second indication information, a downlink signal arrival time of the source cell and a downlink signal arrival time of the target cell.

B. The UE determines, according to the downlink signal arrival time (SeNB downlink timing) of the source cell and the downlink signal arrival time (TeNB downlink timing) of the target cell, a downlink synchronization delay difference between the source cell and target cell.

C. The UE determines, according to the downlink synchronization delay difference and the TA of the source cell, the TA used by the UE in the target cell.

A specific calculation formula is as follows:

*TeNB TA=SeNB TA+2\*(TeNB* downlink timing–*SeNB* downlink timing)

That is, a TA of a target eNB (TeNB TA) is equal to a sum of a TA of a source SeNB detected on the UE side and twice a downlink synchronization delay difference between the two eNBs. The TeNB downlink timing is a TeNB downlink signal arrival time detected by the UE. The SeNB downlink timing is an SeNB downlink signal arrival time detected by the UE. In the formula, by default, the source eNB and the target eNB have a same downlink sending moment, that is, the two eNBs are synchronous.

(2) If the two eNBs have different sending moments, the source cell may notify the UE of the synchronization delay difference between the two eNBs to help calculate the TA. Therefore, the formula of calculating the TA of the target eNB is modified as follows:

*TeNB TA=SeNB TA+2\*(TeNB* downlink timing–*SeNB* downlink timing–(*TeNB* transmitting timing–*SeNB* transmitting timing))

The TeNB transmitting timing is the downlink sending moment of the TeNB. The SeNB transmitting timing is the downlink sending moment of the SeNB. (TeNB transmitting timing–SeNB transmitting timing) is a sending moment synchronization delay difference between two cells. During specific implementation, the source cell may separately send the two values to the UE, or send a difference between the two values to the UE.

In the foregoing algorithm, the source eNB corresponds to the source cell, and the target eNB corresponds to the target cell. In description of this example, a base station in the target cell is different from a base station in the source cell. During specific implementation, if the target cell and the source cell have a same base station, a formula similar to the foregoing formula may be used for calculation.

Block S54. The UE separately determines the UL grant of the target cell and an uplink transmit power of the UE in the target cell according to the UL grant the indication information of the UL grant and the uplink transmit power indication information in the handover command.

In this embodiment, a manner of determining, by the UE according to the uplink transmit power indication information, the uplink transmit power used by the UE in the target cell is the same as that in Embodiment 3. Details are not described herein again.

In this embodiment, a manner and an implementation procedure of determining, by the UE according to the UL grant the indication information of the UL grant, the UL grant of the target cell are the same as those in Embodiment 3. Details are not described herein again.

Block S55. The UE sends, according to the UL grant of the target cell and the TA, a handover complete message to the target cell by using the determined uplink transmit power.

In this embodiment, the UE obtains the UL grant of the target cell from the handover command sent by the source cell, calculates the TA of the target cell according to the TA indication information, and determines the uplink transmit power of the UE in the target cell according to the uplink transmit power indication information in the handover command. This skips a random access procedure and shortens a data transmission interruption time in a cell handover procedure.

Figure 10:
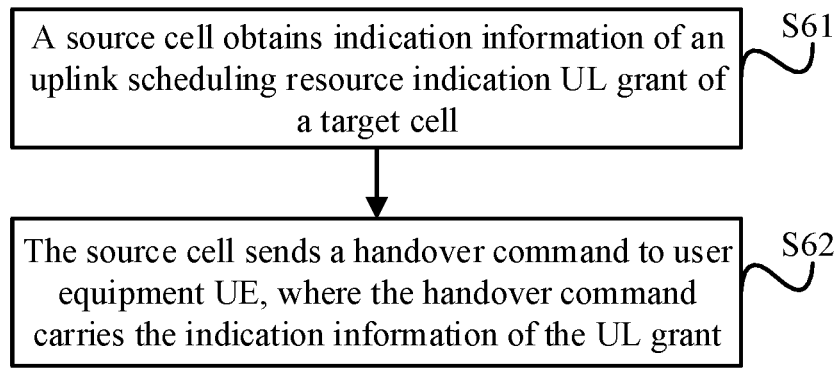
FIG. 10 is a flowchart of a cell handover method according to Embodiment 6.

FIG. 10 is a flowchart of a cell handover method according to Embodiment 6. The method is executed by a source cell. The method includes the following main blocks.

Block S61. The source cell obtains indication information of an uplink scheduling resource indication UL grant indication information of a UL grant of a target cell.

Block S62. The source cell sends a handover command to user equipment UE, where the handover command includes the indication information of the UL grant.

The indication information of a UL grant is used by the UE to determine a UL grant of the target cell. The UE sends uplink data to the target cell according to the UL grant. The uplink data includes at least one of the following: a handover complete message, a buffer status report, or service data.

Figure 11:
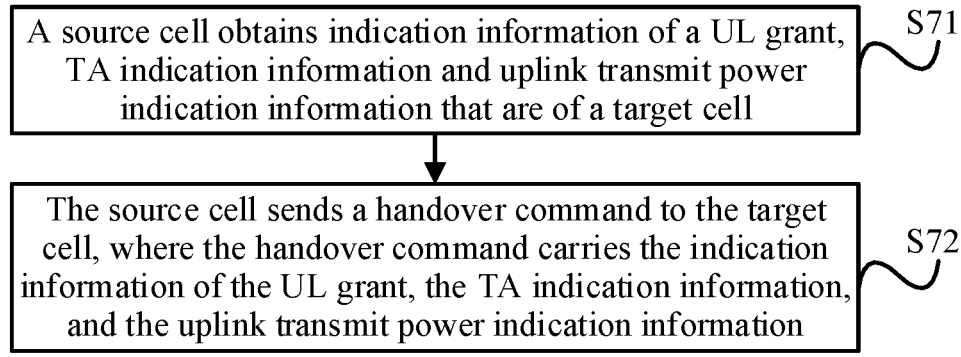
FIG. 11 is a flowchart of a cell handover method according to Embodiment 7.

FIG. 11 is a flowchart of a cell handover method according to Embodiment 7. The method is executed by a source cell. The method includes the following main blocks.

Block S71. The source cell obtains indication information of a UL grant, TA indication information and uplink transmit power indication information that are of a target cell.

To enable UE to complete a cell handover procedure, the UE obtains a UL grant of the target cell and should obtain a TA used by the UE in the target cell and an uplink transmit power for sending data to the target cell by the UE.

In this embodiment, the TA, the UL grant, and the uplink transmit power indication information used by the UE are all obtained by the source cell and sent to the UE.

During specific implementation, the TA and/or the uplink transmit power indication information of the target cell may be preset by the UE, and may not need to be obtained by the source cell.

Block S72. The source cell sends a handover command to the target cell, where the handover command includes the indication information of the UL grant, the TA indication information, and the uplink transmit power indication information.

The indication information of a UL grant sent by the source cell to the UE is used for the UE to determine the UL grant of the target cell according to the UL grant the indication information of the UL grant. The TA indication information is used for the UE to determine the TA used by the UE in the target cell. The uplink transmit power indication information is used for the UE to determine the uplink transmit power of the UE in the target cell.

Figure 12:
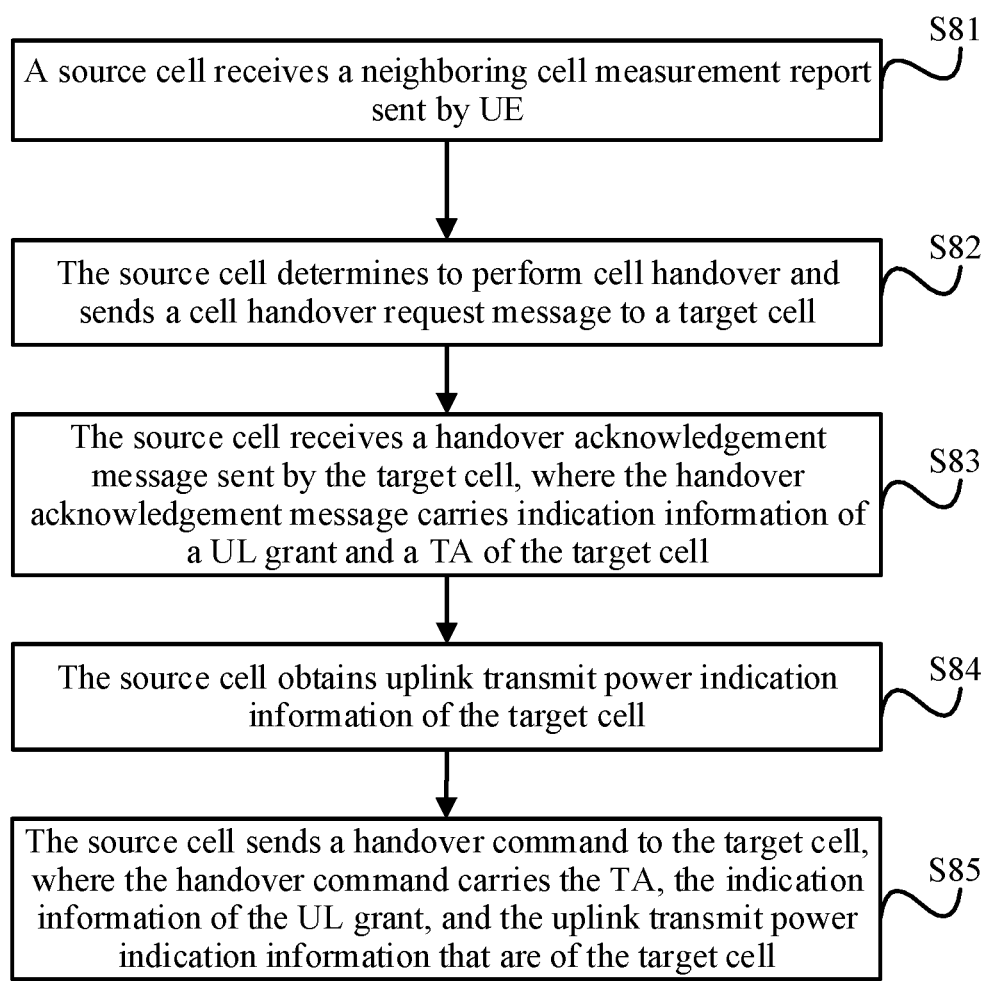
FIG. 12 is a flowchart of a cell handover method according to Embodiment 8.

FIG. 12 is a flowchart of a cell handover method according to Embodiment 8. The method is executed by a source cell. The method includes the following main blocks.

Block S81. The source cell receives a neighboring cell measurement report sent by UE.

Block S82. The source cell determines to perform cell handover and sends a cell handover request message to a target cell.

In this embodiment, the cell handover request message sent by the source cell to the target cell includes UL grant request information and target cell TA request information.

Block S83. The source cell receives a handover acknowledgement message sent by the target cell, where the handover acknowledgement message includes indication information of a UL grant and a TA of the target cell.

The indication information of a UL grant in this embodiment may be implemented in two manners:

Manner 1: The indication information of a UL grant includes a UL grant of the target cell and UL grant effective time information.

The UL grant effective time information includes at least one of the following information: fifth indication information instructing the UL grant to take effect at a preset time after the UE receives the handover command; valid duration or a valid quantity of times indicated by the UL grant; or an effective moment the UL grant.

Manner 2: The indication information of a UL grant includes physical downlink control channel PDCCH monitoring indication information used to instruct the UE to monitor a PDCCH of the target cell, so that the UE monitors the PDCCH according to the PDCCH monitoring indication information, and determines, according to downlink control information DCI transmitted on the detected PDCCH, the UL grant of the target cell.

The PDCCH monitoring indication information includes PDCCH monitoring valid-time information, so that the UE monitors the PDCCH according to the PDCCH monitoring valid-time information.

The PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

A specific procedure of obtaining the indication information of the UL grant by the source cell is described in detail in Embodiment 3, FIG. 6, and FIG. 7. Details are not described herein again.

Block S84. The source cell obtains uplink transmit power indication information of the target cell.

The source cell obtains the uplink transmit power indication information of the UE in the target cell, so that the UE determines an uplink transmit power of the UE in the target cell according to the uplink transmit power indication information.

In this embodiment, the uplink transmit power indication information may be the uplink transmit power that is preset by the source cell and is used by the UE in the target cell; or the uplink transmit power indication information is offset information, preset by the source cell, of offset based on an uplink transmit power of the source cell; or the uplink transmit power indication information is fourth indication information instructing, by the source cell, the UE to determine the uplink transmit power of the UE in the target cell according to a downlink signal transmit power and a downlink signal receive power of the target cell, so that the UE receives, according to the fourth indication information, a cell broadcast message from the target cell, where the cell broadcast message includes the downlink signal transmit power of the target cell; the UE determines, according to the received cell broadcast message, the downlink signal receive power; the UE determines, according to the downlink signal transmit power and the downlink signal receive power, a downlink path loss value of the target cell; and the UE determines, according to the downlink path loss value and a preset receive power expected by the target cell, the uplink transmit power of the UE in the target cell.

Block S85. The source cell sends a handover command to the target cell, where the handover command includes the TA, the indication information of the UL grant, and the uplink transmit power indication information that are of the target cell.

The TA indication information is the TA of the target cell.

In this embodiment, the indication information of the UL grant sent by the source cell to the UE is used for the UE to determine the UL grant of the target cell according to the UL grant the indication information of the UL grant. The TA indication information is used for the UE to determine the TA used by the UE in the target cell. The uplink transmit power indication information is used for the UE to determine the uplink transmit power of the UE in the target cell.

According to the method in this embodiment, the UE obtains the TA and the UL grant used in the target cell from the handover command sent by the source cell, and determines the uplink transmit power of the UE in the target cell according to the uplink transmit power indication information in the handover command. This skips a random access procedure and shortens a data transmission interruption time in a cell handover procedure.

Figure 13:
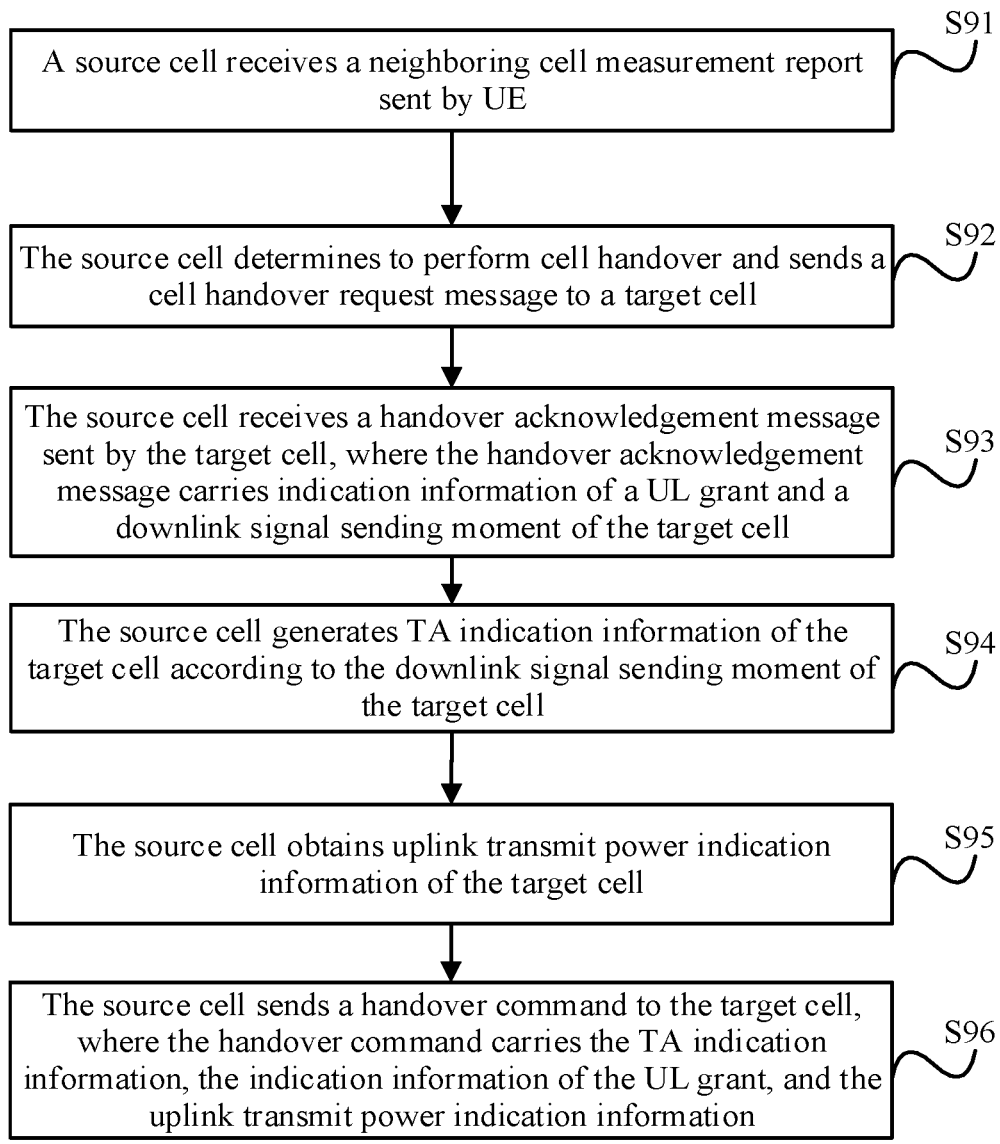
FIG. 13 is a flowchart of a cell handover method according to Embodiment 9.

FIG. 13 is a flowchart of a cell handover method according to Embodiment 9. The method is executed by a source cell. The method includes the following main blocks.

Block S91. The source cell receives a neighboring cell measurement report sent by UE.

Block S92. The source cell determines to perform cell handover and sends a cell handover request message to a target cell.

In this embodiment, the handover request message sent by the source cell to the target cell further includes downlink signal sending moment request information of the target cell and UL grant request information.

Block S93. The source cell receives a handover acknowledgement message sent by the target cell, where the handover acknowledgement message includes indication information of a UL grant and a downlink signal sending moment of the target cell.

In this embodiment, a procedure and a manner of obtaining the indication information of the UL grant by the source cell are the same as those in Embodiment 8. Details are not described herein again.

Block S94. The source cell generates TA indication information of the target cell according to the downlink signal sending moment of the target cell.

A method of generating the TA indication information by the source cell includes:

(1) The source cell determines, according to the downlink signal sending moment of the target cell and a downlink signal sending moment of the source cell, downlink signal sending moment information of the source cell and the target cell.

(2) The source cell determines that the UE has a TA calculation capability, and generates second indication information used to instruct the UE to calculate a TA of the target cell according to a TA of the source cell.

(3) The source cell generates the TA indication information, where the TA indication information includes the TA of the source cell, the second indication information, and the downlink signal sending moment information.

Block S95. The source cell obtains uplink transmit power indication information of the target cell.

In this embodiment, a manner of generating the uplink transmit power indication information of the target cell by the source cell is the same as that in Embodiment 8. Details are not described herein again.

Block S96. The source cell sends a handover command to the target cell, where the handover command includes the TA indication information, the indication information of the UL grant, and the uplink transmit power indication information.

The handover command further includes the TA indication information, so that the UE separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

The downlink signal sending moment information includes the downlink signal sending moment of the source cell and the downlink signal sending moment of the target cell, or the downlink signal sending moment information is a downlink signal sending moment difference between the target cell and the source cell.

The handover command further includes the TA indication information, so that the UE determines the TA used by the UE in the target cell according to the TA indication information.

Figure 14:
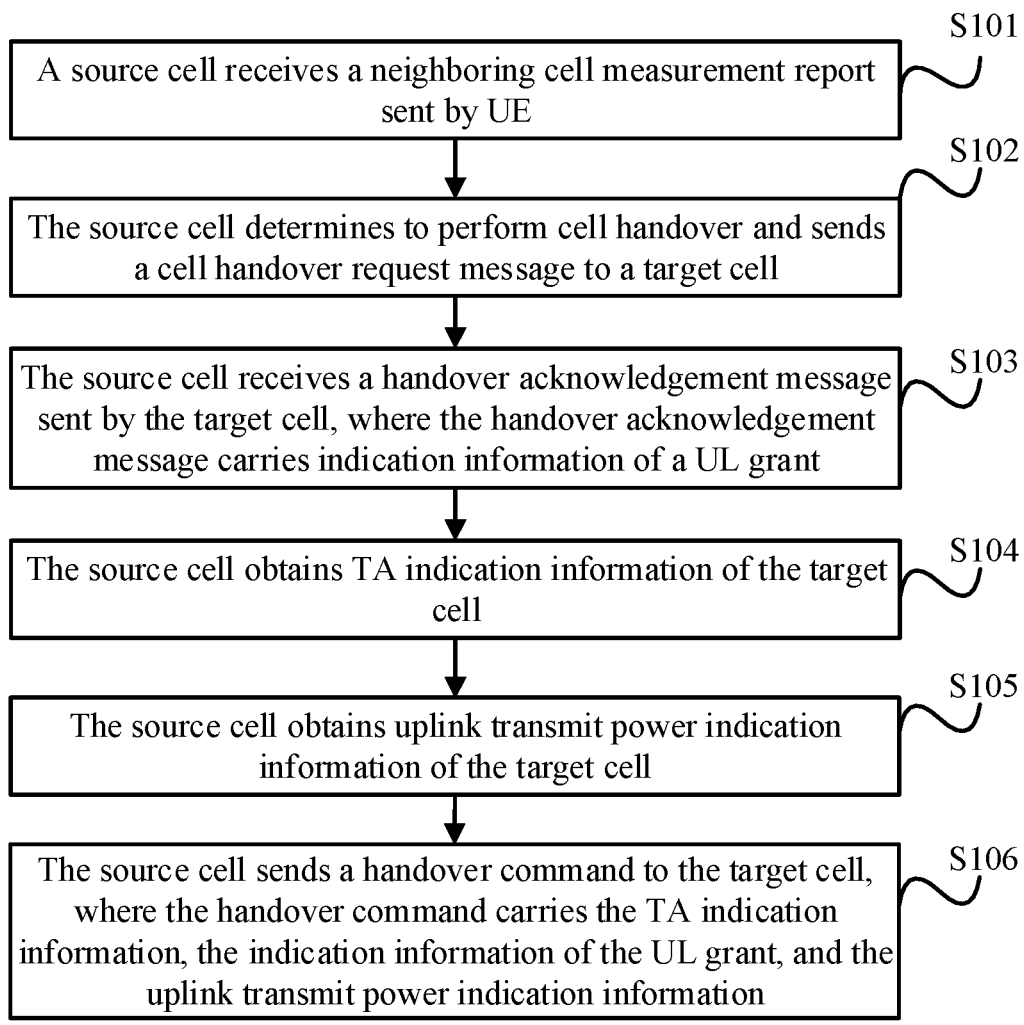
FIG. 14 is a flowchart of a cell handover method according to Embodiment 10.

FIG. 14 is a flowchart of a cell handover method according to Embodiment 10. The method is executed by a source cell. The method includes the following main blocks.

Block S101. The source cell receives a neighboring cell measurement report sent by UE.

Block S102. The source cell determines to perform cell handover and sends a cell handover request message to a target cell.

The handover request message includes UL grant request information.

Block S103. The source cell receives a handover acknowledgement message sent by the target cell, where the handover acknowledgement message includes indication information of a UL grant.

Block S104. The source cell obtains TA indication information of the target cell.

The source cell determines that a downlink signal of the source cell and a downlink signal of the target cell are synchronization signals, and generates third indication information indicating that the downlink signal of the source cell and the downlink signal of the target cell are synchronization signals. The third indication information is downlink signal sending moment information of the source cell and the target cell.

The source cell determines that the UE has a TA calculation capability, and generates second indication information used to instruct the UE to calculate a TA of the target cell according to a TA of the source cell.

The source cell generates the TA indication information. The TA indication information includes the TA of the source cell, the second indication information, and the downlink signal sending moment information, so that the UE separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

That the source cell obtains timing advance TA indication information of the target cell includes: determining, by the source cell, whether the source cell and the target cell are in a coordinated multipoint transmission COMP communication scenario; and if the source cell and the target cell are in a COMP communication scenario, determining, by the source cell, that the TA indication information is first indication information indicating that the TA of the target cell is the same as the TA of the source cell, so that the UE uses, according to the first indication information, the TA of the source cell as the TA of the target cell.

Block S105. The source cell obtains uplink transmit power indication information of the target cell.

Block S106. The source cell sends a handover command to the target cell, where the handover command includes the TA indication information, the indication information of the UL grant, and the uplink transmit power indication information.

Figure 15:
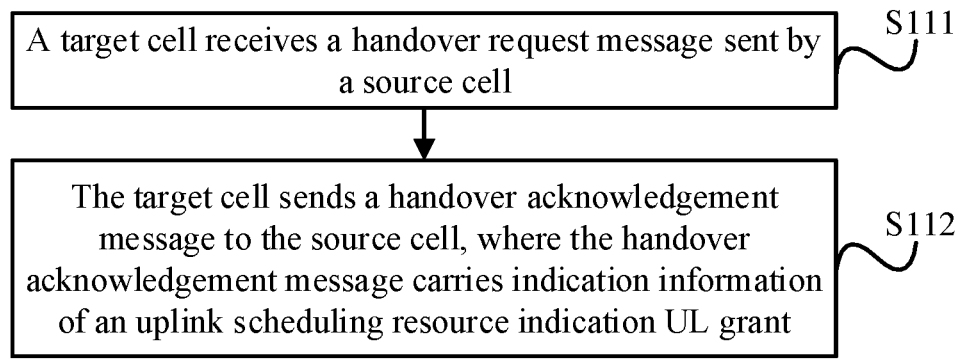
FIG. 15 is a flowchart of a cell handover method according to Embodiment 11.

FIG. 15 is a flowchart of a cell handover method according to Embodiment 11. The method is executed by a target cell. The method includes the following main blocks.

Block S111. The target cell receives a handover request message sent by a source cell.

Block S112. The target cell sends a handover acknowledgement message to the source cell, where the handover acknowledgement message includes indication information of an uplink scheduling resource indication UL grant indication information of a UL grant, and is used by the source cell to send a handover command to UE according to the handover acknowledgement message, where the handover command includes the indication information of the UL grant, and the indication information of the UL grant is used by the UE to determine the UL grant of the target cell, so that the UE sends, according to the UL grant, uplink data to the target cell, where the uplink data includes at least one of the following: a handover complete message, a buffer status report, or service data.

Figure 16:
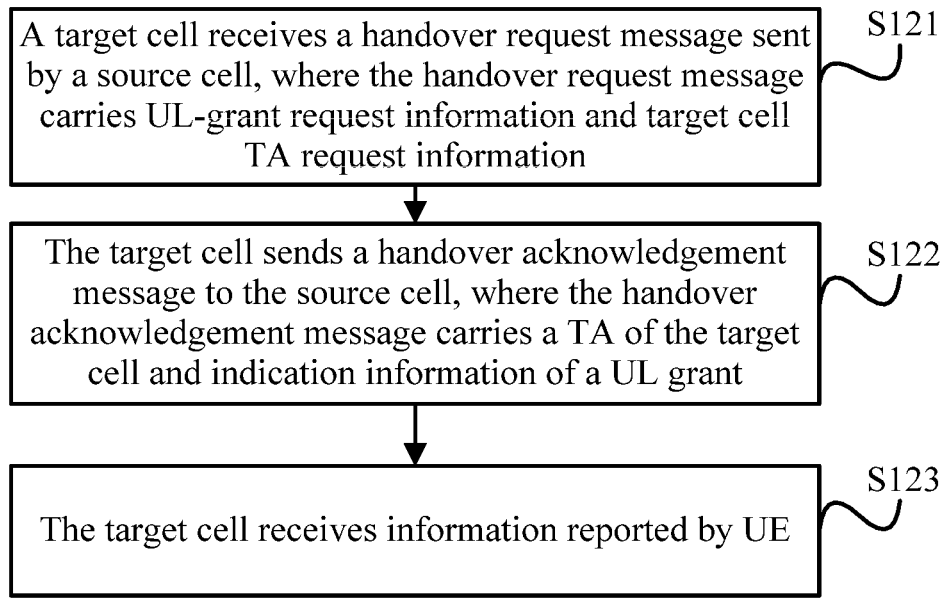
FIG. 16 is a flowchart of a cell handover method according to Embodiment 12.

FIG. 16 is a flowchart of a cell handover method according to Embodiment 12. The method is executed by a target cell. The method includes the following main blocks.

Block S121. The target cell receives a handover request message sent by a source cell, where the handover request message includes UL grant request information and target cell TA request information.

Block S122. The target cell sends a handover acknowledgement message to the source cell, where the handover acknowledgement message includes a TA of the target cell and indication information of a UL grant.

The TA of the target cell is used as TA indication information by the source cell.

In addition, during specific implementation of this embodiment in the specification, the handover acknowledgement message may not carry the TA of the target cell, but includes a downlink signal sending moment of the target cell. The source cell determines, according to the downlink signal sending moment of the target cell and a downlink signal sending moment of the source cell, downlink signal sending moment information of the source cell and the target cell.

In this case, the handover request message may carry downlink signal sending moment request information of the target cell.

In this embodiment, the indication information of the UL grant includes the UL grant of the target cell and UL grant effective time information.

The UL grant effective time information includes at least one of the following information:

fifth indication information instructing the UL grant to take effect at a preset time after UE receives a handover command;

valid duration or a valid quantity of times of the UL grant; or an effective moment of the UL grant.

Alternatively, the indication information of the UL grant includes physical downlink control channel PDCCH monitoring indication information used to instruct the UE to monitor a PDCCH of the target cell, so that the UE monitors the PDCCH according to the PDCCH monitoring indication information, and determines, according to downlink control information DCI transmitted on the detected PDCCH, the UL grant of the target cell.

The PDCCH monitoring indication information includes PDCCH monitoring valid-time information, so that the UE monitors the PDCCH according to the PDCCH monitoring valid-time information.

The PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

Block S123: The target cell receives information reported by UE.

Specifically, the target cell receives uplink data on a communication resource corresponding to the UL grant. The uplink data includes at least one of the following: a handover complete message, a buffer status report, or service data; or the target cell detects an acknowledgement ACK message on a communication resource corresponding to the UL grant, and determines, according to the ACK message, that the UE has detected the PDCCH; or the target cell detects a demodulation reference signal DMRS on a communication resource corresponding to the UL grant.

The target cell determines whether a cyclic shift value of the detected DMRS is the same as a first cyclic shift value carried in the UL grant. If they are different, the target cell determines that the UE has detected the PDCCH.

Figure 17:
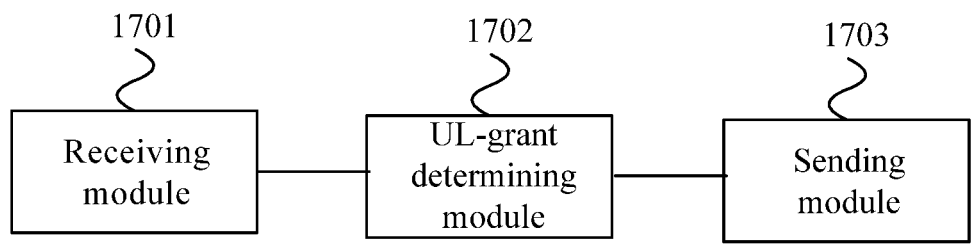
FIG. 17 is a schematic diagram of a structure of a cell handover apparatus according to Embodiment 1.

FIG. 17 is a schematic diagram of a structure of a cell handover apparatus according to Embodiment 1. The apparatus is used as user equipment UE and includes: a receiving module 1701, a UL grant determining module 1702, and a sending module 1703.

The receiving module 1701 is configured to receive a handover command sent by a source cell. The handover command includes indication information of an uplink scheduling resource indication UL grant indication information of a UL grant of a target cell.

The UL grant determining module 1702 is configured to determine, according to the UL grant the indication information of the UL grant, a UL grant of the target cell.

The sending module 1703 is configured to send, according to the UL grant, uplink data to the target cell. The uplink data includes at least one of the following: a handover complete message, a buffer status report, or service data.

In this embodiment, the apparatus further includes a TA determining module.

The handover command further includes timing advance TA indication information.

The TA determining module is configured to determine a TA used by the UE in the target cell according to the TA indication information.

Correspondingly, the sending module 1703 is specifically configured to send, according to the TA used in the target cell and the UL grant, the uplink data to the target cell.

In this embodiment, the TA indication information is the TA used by the UE in the target cell; or the TA indication information is first indication information indicating that the TA of the target cell is the same as a TA of the source cell.

Correspondingly, the TA determining module is specifically configured to use, according to the first indication information, the TA used by the UE in the source cell as the TA used in the target cell.

Alternatively, the TA indication information includes the TA of the source cell, second indication information instructing to calculate the TA of the target cell based on the TA of the source cell, and downlink signal sending moment information of the source cell and the target cell.

Correspondingly, the TA determining module is specifically configured to separately detect, according to the second indication information, a downlink signal arrival time of the source cell and a downlink signal arrival time of the target cell;

determine, according to the downlink signal arrival time of the source cell, the downlink signal arrival time of the target cell, and the downlink signal sending moment information of the source cell and the target cell, a downlink synchronization delay difference between the source cell and the target cell; and determine, according to the downlink synchronization delay difference and the TA of the source cell, the TA used by the UE in the target cell.

In this embodiment, the downlink signal sending moment information is at least one of the following:

third indication information indicating a downlink signal of the source cell and a downlink signal of the target cell are synchronization signals;

a downlink signal sending moment of the source cell and a downlink signal sending moment of the target cell; or a downlink signal sending moment difference between the target cell and the source cell.

In this embodiment, the apparatus further includes an uplink transmit power determining module.

The handover command further includes uplink transmit power indication information.

The uplink transmit power determining module is configured to determine, according to the uplink transmit power indication information, an uplink transmit power of the UE in the target cell.

Correspondingly, the sending module 1703 is specifically configured to send, according to the UL grant, the uplink data to the target cell by using the uplink transmit power.

In this embodiment, the uplink transmit power indication information is the uplink transmit power used by the UE in the target cell; or the uplink transmit power indication information is offset information of offset based on an uplink transmit power of the source cell; or the uplink transmit power indication information is fourth indication information instructing the UE to determine the uplink transmit power of the UE in the target cell according to a downlink signal transmit power and a downlink signal receive power of the target cell.

Correspondingly, the uplink transmit power determining module is specifically configured to receive, according to the fourth indication information, a cell broadcast message from the target cell, where the cell broadcast message includes the downlink signal transmit power of the target cell; determine, according to the received cell broadcast message, the downlink signal receive power; determine, according to the downlink signal transmit power and the downlink signal receive power, a downlink path loss value of the target cell; and determine, according to the downlink path loss value and a preset receive power expected by the target cell, the uplink transmit power of the UE in the target cell.

In this embodiment, the indication information of the UL grant includes the UL grant of the target cell and UL grant effective time information.

In this embodiment, the UL grant effective time information includes at least one of the following information:

fifth indication information instructing the UL grant to take effect at a preset time after UE receives a handover command;

valid duration or a valid quantity of times of the UL grant; or an effective moment of the UL grant.

In this embodiment, the indication information of the UL grant includes physical downlink control channel PDCCH monitoring indication information used to instruct the UE to monitor a PDCCH of the target cell.

Correspondingly, the UL grant determining module 1702 is specifically configured to monitor the PDCCH according to the PDCCH monitoring indication information; and determine, according to downlink control information DCI transmitted on the detected PDCCH, the UL grant of the target cell.

In this embodiment, the PDCCH monitoring indication information includes PDCCH monitoring valid-time information.

Correspondingly, the UL grant determining module 1702 is specifically configured to monitor the PDCCH according to the PDCCH monitoring valid-time information.

In this embodiment, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

In this embodiment, the apparatus further includes a PDCCH detection determining module, configured to send, after determining, according to the downlink control information DCI transmitted on the detected PDCCH, the UL grant of the target cell, and before sending the uplink data, an acknowledgement ACK message to the target cell on a physical uplink control channel PUCCH corresponding to the PDCCH, so that the target cell determines, according to the ACK message, that the UE has detected the PDCCH; or the PDCCH detection determining module is configured to send, after determining, according to the downlink control information DCI transmitted on the detected PDCCH, the UL grant of the target cell, and before sending the uplink data, a demodulation reference signal DMRS to the target cell on a communication resource indicated by the UL grant, where the UL grant includes a first cyclic shift value used to instruct the UE to send the DMRS, a cyclic shift value used by the UE to send the DMRS is a second cyclic shift value different from the first cyclic shift value, and the second cyclic shift value is used by the target cell to determine, according to the DMRS sent by the UE, that the UE has detected the PDCCH.

Figure 18:
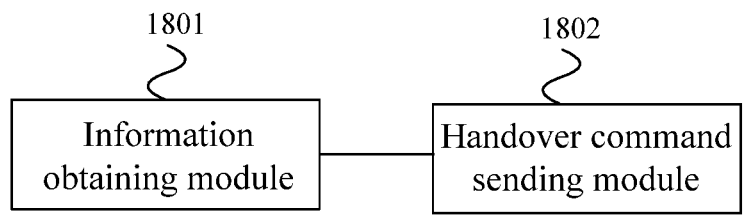
FIG. 18 is a schematic diagram of a structure of a cell handover apparatus according to Embodiment 2.

FIG. 18 is a schematic diagram of a structure of a cell handover apparatus according to Embodiment 2. The apparatus is used as a source cell communications terminal and includes: an information obtaining module 1801, and a handover command sending module 1802.

The information obtaining module 1801 is configured to obtain indication information of an uplink scheduling resource indication UL grant indication information of a UL grant of a target cell.

The handover command sending module 1802 is configured to send a handover command to user equipment UE. The handover command includes the indication information of the UL grant, and the indication information of the UL grant is used by the UE to determine the UL grant of the target cell, so that the UE sends, according to the UL grant, uplink data to the target cell. The uplink data includes at least one of the following: a handover complete message, a buffer status report, or service data.

In this embodiment, the information obtaining module 1801 is specifically configured to send a handover request message to the target cell; and receive a handover acknowledgement message sent by the target cell. The handover acknowledgement message includes the indication information of the UL grant.

In this embodiment, the handover request message includes UL grant request information.

In this embodiment, the handover acknowledgement message further includes a TA of the target cell.

The information obtaining module 1801 is further configured to use the TA of the target cell as the TA indication information.

Correspondingly, the handover command further includes the TA indication information.

In this embodiment, the handover request message further includes target cell TA request information.

In this embodiment, the handover acknowledgement message further includes a downlink signal sending moment of the target cell.

The information obtaining module 1801 is further configured to determine, according to the downlink signal sending moment of the target cell and a downlink signal sending moment of the source cell, downlink signal sending moment information of the source cell and the target cell;

generate second indication information used to instruct the UE to calculate a TA of the target cell according to a TA of the source cell; and generate TA indication information, where the TA indication information includes the TA of the source cell, the second indication information, and the downlink signal sending moment information.

Correspondingly, the handover command further includes the TA indication information, so that the UE separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

In this embodiment, the downlink signal sending moment information includes the downlink signal sending moment of the source cell and the downlink signal sending moment of the target cell, or the downlink signal sending moment information is a downlink signal sending moment difference between the target cell and the source cell.

In this embodiment, the handover request message further includes downlink signal sending moment request information of the target cell.

In this embodiment, the information obtaining module 1801 is further configured to obtain timing advance TA indication information of the target cell.

Correspondingly, the handover command further includes the TA indication information, so that the UE determines the TA used by the UE in the target cell according to the TA indication information.

In this embodiment, the information obtaining module 1801 is specifically configured to determine that a downlink signal of the source cell and the target cell are synchronization signals, and generate third indication information indicating that the downlink signal of the source cell and the downlink signal of the target cell are synchronization signals, where the third indication information is downlink signal sending moment information of the source cell and the target cell; generate second indication information used to instruct the UE to calculate a TA of the target cell according to a TA of the source cell; and generate TA indication information, where the TA indication information includes the TA of the source cell, the second indication information, and the downlink signal sending moment information, so that the UE separately detects, according to the second indication information, a downlink signal arrival time of the source cell and a downlink signal arrival time of the target cell, determines a downlink synchronization delay difference between the source cell and target cell according to the downlink signal arrival time of the source cell, the downlink signal arrival time of the target cell, and the downlink signal sending moment information of the source cell and the target cell, and determines the TA of the target cell according to the downlink synchronization delay difference and the TA of the source cell.

In this embodiment, the information obtaining module 1801 is specifically configured to determine whether the source cell and the target cell are in a coordinated multipoint transmission COMP communication scenario; and if the source cell and the target cell are in a COMP communication scenario, determine that the TA indication information is first indication information indicating that the TA of the target cell is the same as the TA of the source cell, so that the UE uses, according to the first indication information, the TA of the source cell as the TA of the target cell.

In this embodiment, the information obtaining module 1801 is further configured to obtain uplink transmit power indication information of the UE in the target cell, so that the UE determines, according to the uplink transmit power indication information, an uplink transmit power of the UE in the target cell.

Correspondingly, the handover command includes the uplink transmit power indication information.

In this embodiment, the uplink transmit power indication information is the uplink transmit power that is preset by the source cell and is used by the UE in the target cell; or the uplink transmit power indication information is offset information, preset by the source cell, of offset based on an uplink transmit power of the source cell; or the uplink transmit power indication information is fourth indication information instructing, by the source cell, the UE to determine the uplink transmit power of the UE in the target cell according to a downlink signal transmit power and a downlink signal receive power of the target cell, so that the UE receives, according to the fourth indication information, a cell broadcast message from the target cell, where the cell broadcast message includes the downlink signal transmit power of the target cell; the UE determines, according to the received cell broadcast message, the downlink signal receive power; the UE determines, according to the downlink signal transmit power and the downlink signal receive power, a downlink path loss value of the target cell; and the UE determines, according to the downlink path loss value and a preset receive power expected by the target cell, the uplink transmit power of the UE in the target cell.

In this embodiment, the indication information of the UL grant includes the UL grant of the target cell and UL grant effective time information.

In this embodiment, the UL grant effective time information includes at least one of the following information:

fifth indication information instructing the UL grant to take effect at a preset time after UE receives a handover command;

valid duration or a valid quantity of times of the UL grant; or an effective moment of the UL grant.

In this embodiment, the indication information of the UL grant includes physical downlink control channel PDCCH monitoring indication information used to instruct the UE to monitor a PDCCH of the target cell, so that the UE monitors the PDCCH according to the PDCCH monitoring indication information, and determines, according to downlink control information DCI transmitted on the detected PDCCH, the UL grant of the target cell.

In this embodiment, the PDCCH monitoring indication information includes PDCCH monitoring valid-time information, so that the UE monitors the PDCCH according to the PDCCH monitoring valid-time information.

In this embodiment, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

Figure 19:
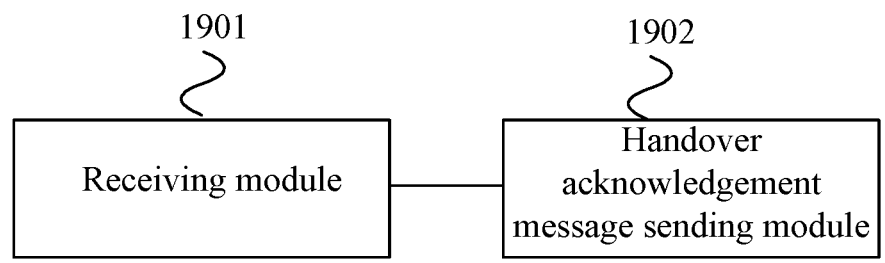
FIG. 19 is a schematic diagram of a structure of a cell handover apparatus according to Embodiment 3.

FIG. 19 is a schematic diagram of a structure of a cell handover apparatus according to Embodiment 3. The apparatus is used as a target cell communications terminal and includes: a receiving module 1901 and a handover acknowledgement message sending module 1902.

The receiving module 1901 is configured to receive a handover request message sent by a source cell.

The handover acknowledgement message sending module 1902 is configured to send a handover acknowledgement message to the source cell. The handover acknowledgement message includes indication information of an uplink scheduling resource indication UL grant indication information of a UL grant, and is used by the source cell to send a handover command to UE according to the handover acknowledgement message. The handover command includes the indication information of the UL grant, and the indication information of the UL grant is used by the UE to determine the UL grant of the target cell, so that the UE sends, according to the UL grant, uplink data to the target cell. The uplink data includes at least one of the following: a handover complete message, a buffer status report, or service data.

In this embodiment, the handover request message includes UL grant request information.

In this embodiment, the handover acknowledgement message further includes a TA of the target cell, and the source cell uses the TA of the target cell as TA indication information.

In this embodiment, the handover request message further includes target cell TA request information.

In this embodiment, the handover acknowledgement message further includes a downlink signal sending moment of the target cell. The source cell determines, according to the downlink signal sending moment of the target cell and a downlink signal sending moment of the source cell, downlink signal sending moment information of the source cell and the target cell.

In this embodiment, the handover request message further includes downlink signal sending moment request information of the target cell.

In this embodiment, the indication information of the UL grant includes the UL grant of the target cell and UL grant effective time information.

In this embodiment, the UL grant effective time information includes at least one of the following information:

fifth indication information instructing the UL grant to take effect at a preset time after UE receives a handover command;

valid duration or a valid quantity of times of the UL grant; or an effective moment of the UL grant.

In this embodiment, the indication information of the UL grant includes physical downlink control channel PDCCH monitoring indication information used to instruct the UE to monitor a PDCCH of the target cell, so that the UE monitors the PDCCH according to the PDCCH monitoring indication information, and determines, according to downlink control information DCI transmitted on the detected PDCCH, the UL grant of the target cell.

In this embodiment, the PDCCH monitoring indication information includes PDCCH monitoring valid-time information, so that the UE monitors the PDCCH according to the PDCCH monitoring valid-time information.

In this embodiment, the PDCCH monitoring valid-time information includes at least one of the following:

sixth indication information instructing to start monitoring the PDCCH at the preset time after receiving the handover command;

valid duration or a valid quantity of times of the PDCCH; or a moment at which the PDCCH is monitored.

In this embodiment, the receiving module 1901 is further configured to receive the uplink data on a communication resource corresponding to the UL grant; or the receiving module 1901 is further configured to detect an acknowledgement ACK message on a communication resource corresponding to the UL grant, and determine, according to the ACK message, that the UE has detected the PDCCH; or the receiving module 1901 is further configured to detect a demodulation reference signal DMRS on a communication resource corresponding to the UL grant; determine whether a cyclic shift value of the detected DMRS is the same as a first cyclic shift value carried in the UL grant, and if they are different, determine that the UE has detected the PDCCH.

Figure 20:
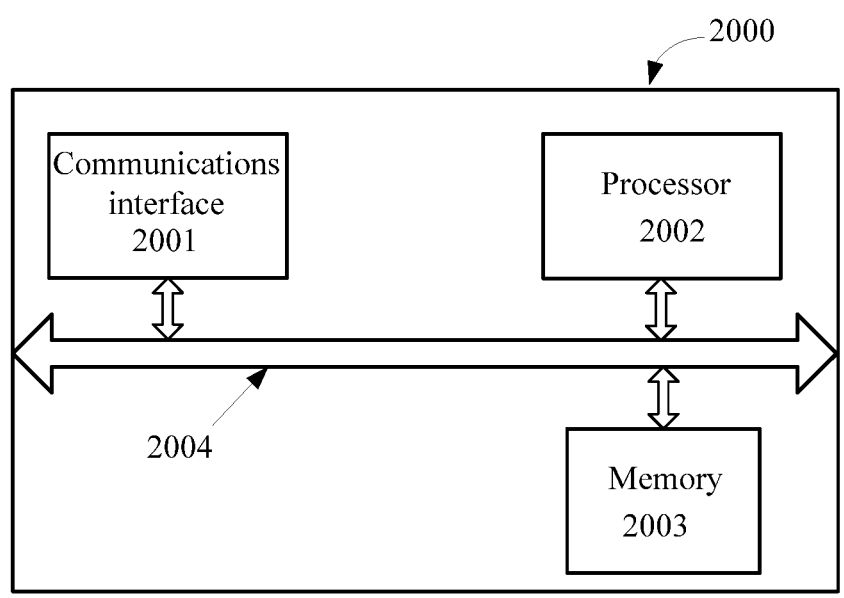
FIG. 20 is a schematic diagram of a structure of a user terminal device according to Embodiment 1.

FIG. 20 is a schematic diagram of a structure of a user terminal device according to Embodiment 1. The user terminal device 2000 includes a communications interface 2001, a memory 2003, and a processor 2002. The communications interface 2001, the processor 2002, and the memory 2003 are connected to each other by using a bus 2004. The bus 2004 may be a peripheral component interconnect (PCI) bus or an extended industry standard architecture (EISA) bus. The bus may be classified into an address bus, a data bus, a control bus, and the like. For ease of denotation, the bus is represented by using one thick line in FIG. 20. However, this does not indicate that there is only one bus or only one type of bus.

The communications interface 2001 is configured to communicate with a transmit end. The memory 2003 is configured to store a program. Specifically, the program may include program code, and the program code includes a computer operation instruction. The memory 2003 may include a random access memory (RAM), or may further include a non-volatile memory, for example, at least one disk memory.

The processor 2002 executes the program stored in the memory 2003, to implement the method in the foregoing method embodiment. The method includes the following operations:

receiving a handover command sent by a source cell, where the handover command includes indication information of an uplink scheduling resource indication UL grant indication information of a UL grant of a target cell;

determining a UL grant of the target cell according to the UL grant the indication information of the UL grant; and sending, according to the UL grant, uplink data to the target cell, where the uplink data includes at least one of the following: a handover complete message, a buffer status report, or service data.

The processor 2002 may be a general processor, including a central processing unit (CPU), a network processor (NP), or the like; or may be a digital signal processor (DSP), an application-specific integrated circuit (ASIC), a field programmable gate array (FPGA), or another programmable logical device, discrete gate or transistor logical device, or discrete hardware component.

Figure 21:
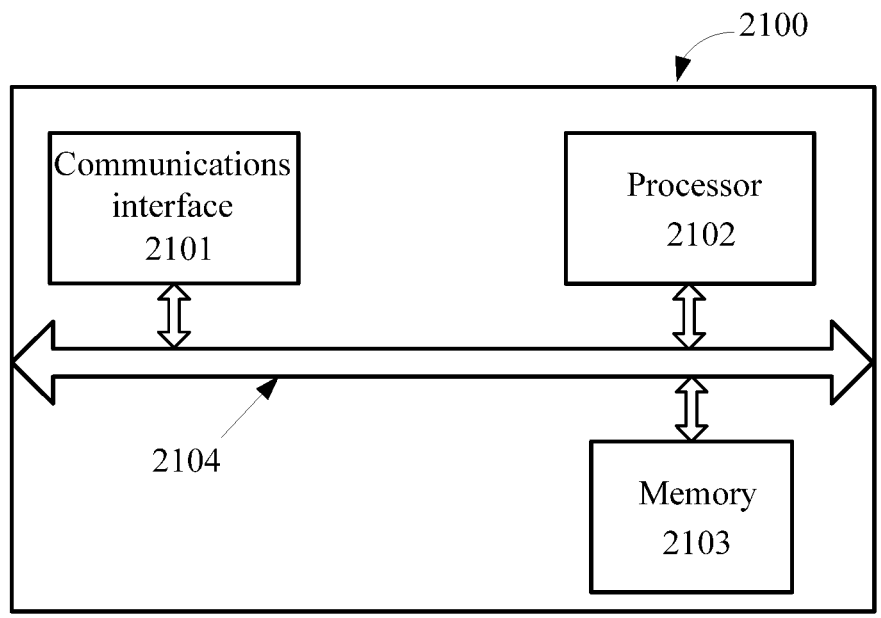
FIG. 21 is a schematic diagram of a structure of a terminal device according to Embodiment 1.

FIG. 21 is a schematic diagram of a structure of a terminal device according to Embodiment 1. The terminal device 2100 includes a communications interface 2101, a memory 2103, and a processor 2102. The communications interface 2101, the processor 2102, and the memory 2103 are connected to each other by using a bus 2104. The bus 2104 may be a peripheral component interconnect (PCI) bus or an extended industry standard architecture (EISA) bus. The bus may be classified into an address bus, a data bus, a control bus, and the like. For ease of denotation, the bus is represented by using one thick line in FIG. 21. However, this does not indicate that there is only one bus or only one type of bus.

The communications interface 2101 is configured to communicate with a transmit end. The memory 2103 is configured to store a program. Specifically, the program may include program code, and the program code includes a computer operation instruction. The memory 2103 may include a random access memory (RAM), or may further include a non-volatile memory, for example, at least one disk memory.

The processor 2102 executes the program stored in the memory 2103, to implement the method in the foregoing method embodiment. The method includes the following operations:

obtaining indication information of an uplink scheduling resource indication UL grant indication information of a UL grant of a target cell;

sending a handover command to user equipment UE, where the handover command includes the indication information of the UL grant, and the indication information of the UL grant is used by the UE to determine the UL grant of the target cell, so that the UE sends, according to the UL grant, uplink data to the target cell; the uplink data includes at least one of the following: a handover complete message, a buffer status report, or service data.

The processor 2102 may be a general processor, including a central processing unit (CPU), a network processor (NP), or the like; or may be a digital signal processor (DSP), an application-specific integrated circuit (ASIC), a field programmable gate array (FPGA), or another programmable logical device, discrete gate or transistor logical device, or discrete hardware component.

Figure 22:
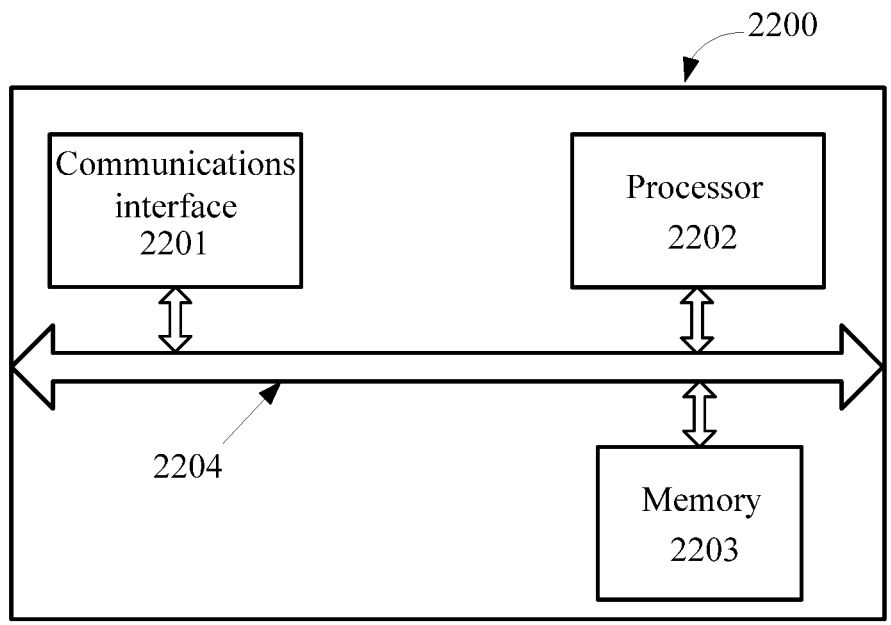
FIG. 22 is a schematic diagram of a structure of a terminal device according to Embodiment 2.

FIG. 22 is a schematic diagram of a structure of a terminal device according to Embodiment 2. The terminal device 2200 includes a communications interface 2201, a memory 2203, and a processor 2202. The communications interface 2201, the processor 2202, and the memory 2203 are connected to each other by using a bus 2204. The bus 2204 may be a peripheral component interconnect (PCI) bus or an extended industry standard architecture (EISA) bus. The bus may be classified into an address bus, a data bus, a control bus, and the like. For ease of denotation, the bus is represented by using one thick line in FIG. 22. However, this does not indicate that there is only one bus or only one type of bus.

The communications interface 2201 is configured to communicate with a transmit end. The memory 2203 is configured to store a program. Specifically, the program may include program code, and the program code includes a computer operation instruction. The memory 2203 may include a random access memory (RAM), or may further include a non-volatile memory, for example, at least one disk memory.

The processor 2202 executes the program stored in the memory 2203, to implement the method in the foregoing method embodiment. The method includes the following operations:

receiving a handover request message sent by a source cell; and sending a handover acknowledgement message to the source cell, where the handover acknowledgement message includes indication information of an uplink scheduling resource indication UL grant indication information of a UL grant, and is used by the source cell to send a handover command to UE according to the handover acknowledgement message, where the handover command includes the indication information of the UL grant, and the indication information of the UL grant is used by the UE to determine the UL grant of the target cell, so that the UE sends, according to the UL grant, uplink data to the target cell, where the uplink data includes at least one of the following: a handover complete message, a buffer status report, or service data.

The processor 2202 may be a general processor, including a central processing unit (CPU), a network processor (NP), or the like; or may be a digital signal processor (DSP), an application-specific integrated circuit (ASIC), a field programmable gate array (FPGA), or another programmable logical device, discrete gate or transistor logical device, or discrete hardware component.

The apparatus and device in the embodiments may correspondingly execute the methods in the foregoing embodiments. Therefore, the apparatus and device embodiments are not be described in detail again.

According to the cell handover method and apparatus, and the device in the embodiments, UE obtains an uplink transmission resource such as UL grant from the source cell, skips a random access procedure, and shortens a data transmission interruption time, to reduce a data transmission delay time in the cell handover procedure.

The method, apparatus, and terminal in the embodiments may be applied to a cell handover scenario of an LTE (Long Term Evolution) system. If a base station of the source cell is different from a base station of the target cell, the base station of the source cell and base station of the target cell can communicate through an X2 interface. If the X2 interface does not exist between eNBs, or the X2 interface cannot be used for a handover procedure, communication between the eNBs may be forwarded by an MME.

In the embodiments, manners of determining and obtaining information such as the TA, the UL grant, and the uplink transmit power of the target cell may be combined. Combinations in the foregoing embodiments are only examples to describe the technical solutions in the specification. Other combination manners are not enumerated in the specification.

A person of ordinary skill in the art may understand that all or some of the operations of the method embodiments may be implemented by a program instructing relevant hardware. The program may be stored in a computer readable storage medium. When the program runs, the operations of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions, but not for limiting the specification. Although the specification is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A cell handover method, the method comprising:
receiving, by a user terminal, a handover command sent by a source cell, wherein the handover command comprises indication information of an uplink scheduling resource indication of a target cell, and wherein the handover command further comprises timing advance (TA) indication information;
determining, by the user terminal based on the indication information of the uplink scheduling resource indication and without using a random access procedure, the uplink scheduling resource indication of the target cell;
determining, by the user terminal based on the TA indication information, a TA used by the user terminal in the target cell, wherein the TA indication information comprises the TA used by the user terminal in the target cell or the TA indication information comprises first indication information indicating that a TA of the target cell is the same as a TA of the source cell, and wherein the determining the TA used by the user terminal in the target cell comprises:
using, by the user terminal based on the first indication information, a TA used by the user terminal in the source cell as the TA used in the target cell;
or
wherein the TA indication information comprises the TA of the source cell, second indication information instructing to calculate the TA of the target cell based on the TA of the source cell, and downlink signal sending moment information of the source cell and the target cell, and wherein the determining, by the user terminal based on the TA indication information, the TA used by the user terminal in the target cell comprises:
separately detecting, by the user terminal based on the second indication information, a downlink signal arrival time of the source cell and a downlink signal arrival time of the target cell;

determining, by the user terminal based on the downlink signal arrival time of the source cell, the downlink signal arrival time of the target cell, and the downlink signal sending moment information of the source cell and the target cell, a downlink synchronization delay difference between the source cell and the target cell; and determining, by the user terminal based on the downlink synchronization delay difference and the TA of the source cell, the TA used by the user terminal in the target cell; and sending, by the user terminal based on the TA used in the target cell and the uplink scheduling resource indication, uplink data to the target cell, wherein the uplink data comprises one or more of: a handover complete message, a buffer status report, or service data.

2. The method of claim 1, wherein the indication information of the uplink scheduling resource indication comprises the uplink scheduling resource indication and information about an uplink scheduling resource indication effective time for the target cell.

3. The method of claim 2, wherein the information about the uplink scheduling resource indication effective time comprises one or more of:

fifth indication information instructing the uplink scheduling resource indication to take effect at a preset time after the user terminal receives the handover command;

a valid duration or a valid quantity of times indicated by the uplink scheduling resource indication; or an effective moment indicated by the uplink scheduling resource indication.

4. The method of claim 1, wherein the indication information of the uplink scheduling resource indication comprises physical downlink control channel (PDCCH) monitoring indication information used to instruct the user terminal to monitor a PDCCH of the target cell and wherein determining the uplink scheduling resource indication of the target cell comprises:

monitoring, by the user terminal based on the PDCCH monitoring indication information, the PDCCH; and determining, by the user terminal based on downlink control information (DCI) transmitted on the detected PDCCH, the uplink scheduling resource indication of the target cell.

5. The method of claim 4, further comprising:

sending, by the user terminal, an acknowledgement (ACK) message to the target cell on a physical uplink control channel (PUCCH) corresponding to the PDCCH, wherein the target cell determines, based on the ACK message, that the user terminal has detected the PDCCH; or sending, by the user terminal on a communication resource indicated by the uplink scheduling resource indication, a demodulation reference signal (DMRS) to the target cell, wherein the uplink scheduling resource indication comprises a first cyclic shift value used to instruct the user terminal to send the DMRS, wherein a second cyclic shift value used by the user terminal to send the DMRS is different from the first cyclic shift value, and wherein the second cyclic shift value is used by the target cell to determine, based on the DMRS sent by the user terminal, that the user terminal has detected the PDCCH.

6. A cell handover method, comprising:

obtaining, by a source cell, indication information of an uplink scheduling resource indication of a target cell, comprising:

sending, by the source cell, a handover request message to the target cell, and receiving, by the source cell, a handover acknowledgement message sent by the target cell, wherein the handover acknowledgement message comprises the indication information of the uplink scheduling resource indication, wherein the handover acknowledgement message further comprises a downlink signal sending moment of the target cell;

sending, by the source cell, a handover command to a user terminal without using a random access procedure, wherein the handover command comprises the indication information of the uplink scheduling resource indication, wherein the indication information of the uplink scheduling resource indication is used by the user terminal to determine the uplink scheduling resource indication of the target cell, such that the user terminal sends, based on the uplink scheduling resource indication, uplink data to the target cell, and wherein the uplink data comprises one or more of: a handover complete message, a buffer status report, or service data;

determining, by the source cell based on the downlink signal sending moment of the target cell and a downlink signal sending moment of the source cell, downlink signal sending moment information of the source cell and the target cell;

determining, by the source cell, that the user terminal has a timing advance (TA) calculation capability;

generating second indication information used to instruct the user terminal to calculate a TA of the target cell based on a TA of the source cell; and generating, by the source cell, TA indication information, wherein the TA indication information comprises the TA of the source cell, the second indication information, and the downlink signal sending moment information and wherein the handover command further comprises the TA indication information, wherein the user terminal separately detects, based on the second indication information, a downlink signal arrival time of the source cell and a downlink signal arrival time of the target cell, determines a downlink synchronization delay difference between the source cell and target cell based on the downlink signal arrival time of the source cell, the downlink signal arrival time of the target cell, and the downlink signal sending moment information of the source cell and the target cell, and determines the TA of the target cell based on the downlink synchronization delay difference and the TA of the source cell.

7. The method of claim 6, wherein the handover acknowledgement message further comprises a timing advance (TA) of the target cell, wherein the handover command further comprises TA indication information, and wherein the TA indication information is the TA of the target cell.

8. The method of claim 6, wherein the downlink signal sending moment information comprises:

the downlink signal sending moment of the source cell and the downlink signal sending moment of the target cell; or a downlink signal sending moment difference between the target cell and the source cell.

9. A cell handover method, comprising:

obtaining, by a source cell, indication information of an uplink scheduling resource indication of a target cell;

obtaining, by the source cell, timing advance (TA) indication information of the target cell, comprising determining, by the source cell, that a downlink signal of the source cell and the target cell are synchronization signals;

generating third indication information indicating that the downlink signal of the source cell and the downlink signal of the target cell are synchronization signals, wherein the third indication information is downlink signal sending moment information of the source cell and the target cell;

determining, by the source cell, that the user terminal has a TA calculation capability;

generating second indication information used to instruct the user terminal to calculate a TA of the target cell based on a TA of the source cell; and generating, by the source cell, TA indication information, wherein the TA indication information comprises the TA of the source cell, the second indication information, and the downlink signal sending moment information, wherein the user terminal separately detects, based on the second indication information, a downlink signal arrival time of the source cell and a downlink signal arrival time of the target cell, determines a downlink synchronization delay difference between the source cell and target cell based on the downlink signal arrival time of the source cell, the downlink signal arrival time of the target cell, and the downlink signal sending moment information of the source cell and the target cell, and determines the TA of the target cell based on the downlink synchronization delay difference and the TA of the source cell; and sending, by the source cell, a handover command to a user terminal without using a random access procedure, wherein the handover command comprises the indication information of the uplink scheduling resource indication, wherein the indication information of the uplink scheduling resource indication is used by the user terminal to determine the uplink scheduling resource indication of the target cell, such that the user terminal sends, based on the uplink scheduling resource indication, uplink data to the target cell, and wherein the uplink data comprises one or more of: a handover complete message, a buffer status report, or service data, wherein the handover command further comprises the TA indication information, wherein the user terminal determines, based on the TA indication information, a TA used by the user terminal in the target cell.

* * * * *